United States Patent
Gartner et al.

(10) Patent No.: US 10,429,128 B2
(45) Date of Patent: Oct. 1, 2019

(54) HEAT-TREATMENT OF WATER-ABSORBING POLYMERIC PARTICLES IN A FLUIDIZED BED AT A FAST HEAT-UP RATE

(71) Applicant: EVONIK DEGUSSA GMBH, Essen (DE)

(72) Inventors: Herbert Gartner, Baden-Baden (DE); Marc Hager, Haguenau (FR); Harald Plochinger, Buhl (DE); Sabine Auernig, Haguenau (FR); Hans-Peter Kohler, Buhlertal (DE); Elisabeth Lacker, Rheinau-Freistett (DE)

(73) Assignee: Evonik Degussa GmbH, Essen (DE)

( * ) Notice: Subject to any disclaimer, the term of this patent is extended or adjusted under 35 U.S.C. 154(b) by 601 days.

(21) Appl. No.: 14/358,792

(22) PCT Filed: Dec. 18, 2012

(86) PCT No.: PCT/EP2012/075890
§ 371 (c)(1),
(2) Date: May 16, 2014

(87) PCT Pub. No.: WO2013/110414
PCT Pub. Date: Aug. 1, 2013

(65) Prior Publication Data
US 2014/0345154 A1    Nov. 27, 2014

(30) Foreign Application Priority Data
Jan. 27, 2012 (EP) .................................... 12152795

(51) Int. Cl.
*F26B 3/00* (2006.01)
*B29B 9/16* (2006.01)
(Continued)

(52) U.S. Cl.
CPC .................. *F26B 3/00* (2013.01); *B29B 9/16* (2013.01); *C08J 3/00* (2013.01); *C08J 3/124* (2013.01); *B29B 2009/168* (2013.01)

(58) Field of Classification Search
CPC ........ B29B 9/16; B29B 2009/168; C08J 3/00; C08J 3/124; F26B 3/00
(Continued)

(56) References Cited

U.S. PATENT DOCUMENTS

| 5,342,899 A | 8/1994 | Graham et al. |
| 5,409,771 A | 4/1995 | Dahmen et al. |

(Continued)

FOREIGN PATENT DOCUMENTS

| CN | 1995103 A | 7/2007 |
| CN | 101790546 A | 7/2010 |

(Continued)

OTHER PUBLICATIONS

Buchholz, Frederick L. and Graham, Andrew T., "Modern Superabsorbent Polymer Technology," copyright 1998, John Wiley & Sons, Inc., pp. 87-88 (7 pages). 1998.

(Continued)

*Primary Examiner* — Frances Tischler
(74) *Attorney, Agent, or Firm* — Bernard Lau; Linda S. Li; Jason S. Ngui

(57) ABSTRACT

The present invention relates to a method for heat-treating water-absorbing polymeric particles at a temperature equal to or above 150° C. in a fluidized bed dryer at a fast heat-up rate, the use of a fluidized bed dryer for heat-treating water-absorbing polymeric particles in continuous or batch mode as well as to the heat-treated polymeric particles obtained by the method of the present invention.

17 Claims, 2 Drawing Sheets

Figure 1:
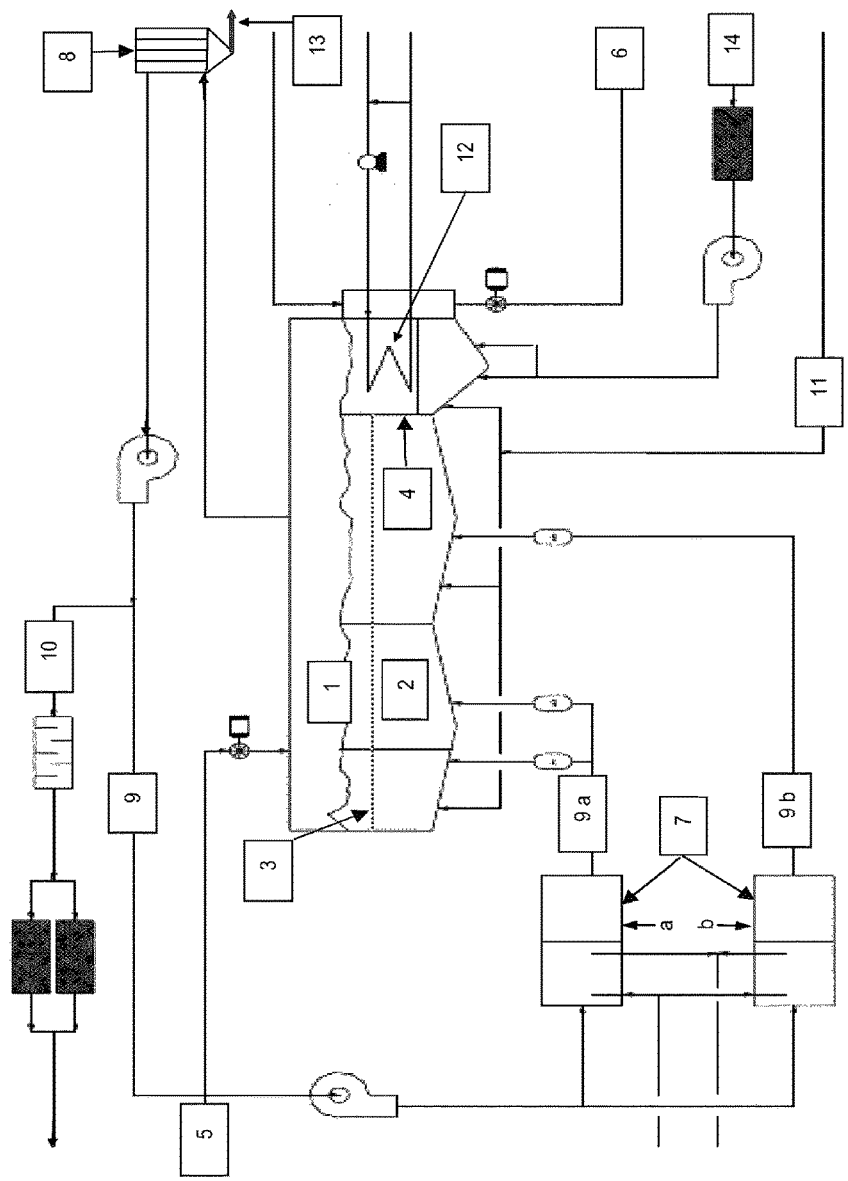

(51) Int. Cl.
*C08J 3/00* (2006.01)
*C08J 3/12* (2006.01)

(58) Field of Classification Search
USPC .................................................. 528/480, 503
See application file for complete search history.

(56) References Cited

U.S. PATENT DOCUMENTS

| | | | |
|---|---|---|---|
| 5,506,324 | A | 4/1996 | Gartner et al. |
| 5,559,335 | A | 9/1996 | Zeng et al. |
| 5,562,646 | A | 10/1996 | Goldman et al. |
| 5,629,377 | A | 5/1997 | Burgert et al. |
| 5,633,316 | A | 5/1997 | Gartner et al. |
| 6,323,252 | B1 | 11/2001 | Gartner et al. |
| 6,835,783 | B1 | 12/2004 | Gartner et al. |
| 6,916,864 | B2 | 7/2005 | Gartner et al. |
| 6,987,151 | B2 | 1/2006 | Gartner et al. |
| 8,048,942 | B2 | 11/2011 | Fricker et al. |
| 8,063,121 | B2 | 11/2011 | Fricker et al. |
| 8,188,163 | B2 | 5/2012 | Matsumoto et al. |
| 8,188,193 | B2 | 5/2012 | Biel et al. |
| 8,198,385 | B2 | 6/2012 | Gartner et al. |
| 8,252,873 | B1 | 8/2012 | Gartner et al. |
| 8,357,766 | B2 | 1/2013 | Fricker et al. |
| 8,592,516 | B2 | 11/2013 | Weismantel et al. |
| 8,791,230 | B2 | 7/2014 | Matsumoto et al. |
| 2007/0149760 | A1 | 6/2007 | Kadonaga et al. |
| 2008/0124551 | A1 | 5/2008 | Daniel et al. |
| 2010/0093917 | A1 | 4/2010 | Torii et al. |
| 2010/0099799 | A1 | 4/2010 | Fricker et al. |
| 2010/0249320 | A1 | 9/2010 | Matsumoto et al. |
| 2011/0112252 | A1 | 5/2011 | Biel et al. |
| 2012/0309905 | A1 | 12/2012 | Fricker et al. |
| 2014/0047730 | A1 | 2/2014 | Weismantel et al. |
| 2014/0121322 | A1 | 5/2014 | Fricker et al. |

FOREIGN PATENT DOCUMENTS

| | | | |
|---|---|---|---|
| CN | 102089014 | A | 6/2011 |
| DE | 4020780 | C1 | 8/1991 |
| EP | 0979250 | B1 | 4/2004 |
| EP | 1800740 | A2 | 6/2007 |
| EP | 2189478 | A1 | 5/2010 |
| EP | 2269720 | A1 | 1/2011 |
| EP | 2270074 | A1 | 1/2011 |
| EP | 2298819 | A1 | 3/2011 |
| EP | 2371869 | A1 | 10/2011 |
| EP | 2581403 | A1 | 4/2013 |
| EP | 2690114 | A1 | 1/2014 |
| EP | 2620465 | B1 | 9/2014 |
| EP | 2620466 | B1 | 9/2014 |
| JP | H8-73518 | A | 3/1996 |
| JP | 2008038128 | A | 2/2008 |
| JP | 5405304 | B2 | 2/2014 |
| TW | I377222 | B | 11/2012 |
| WO | 9420547 | A1 | 9/1994 |
| WO | 2006082241 | A2 | 8/2006 |
| WO | 2007074108 | A1 | 7/2007 |
| WO | 2008/118237 | A1 | 10/2008 |
| WO | 2009028568 | A1 | 3/2009 |
| WO | 2010/003897 | A1 | 1/2010 |
| WO | 2011/155540 | A1 | 12/2011 |

OTHER PUBLICATIONS

Catalogue "CONIDUR®"; published by Hein, Trenz- und Fördertechnik GmbH, Apr. 7, 2000 (32 pages).
Gartner et al., Communication of a Notice of Opposition dated Jun. 18, 2015 in EP 2620465 (45 pages).
Gartner et al., U.S. Appl. No. 14/358,792, filed May 16, 2014.
International Search Report dated Apr. 18, 2013 in PCT/EP2012/075900 (3 pages).
Written Opinion dated Apr. 18, 2013 in PCT/EP2012/075900 (5 pages).
Gartner et al., Office Action dated Jun. 15, 2015 for U.S. Appl. No. 14/358,936 (15 pages).
Buchholz, Frederick L. and Graham, Andrew T., "Modern Superabsorbent Polymer Technology," copyright 1998, John Wiley & Sons, Inc., Chapter 1: "Absorbency and Superabsorbency," pp. 1-17 (19 pages).
Buchholz, Frederick L. and Graham, Andrew T., "Modern Superabsorbent Polymer Technology," copyright 1998, John Wiley & Sons, Inc., Chapter 2: "Chemistry of Superabsorbent Polyacrylates," pp. 19-67 (51 pages).
Buchholz, Frederick L. and Graham, Andrew T., "Modern Superabsorbent Polymer Technology," copyright 1998, John Wiley & Sons, Inc., Chapter 3: "Commercial Processes for the Manufacture of Superabsorbent Polymers," pp. 69-117 (51 pages).
Buchholz, Frederick L. and Graham, Andrew T., "Modern Superabsorbent Polymer Technology," copyright 1998, John Wiley & Sons, Inc., Chapter 4: "Analysis and Characterization of Superabsorbent Polymers," pp. 119-165 (49 pages).
Buchholz, Frederick L. and Graham, Andrew T., "Modern Superabsorbent Polymer Technology," copyright 1998, John Wiley & Sons, Inc., Chapter 5: "The Structure and Properties of Superabsorbent Polyacrylates," pp. 167-221 (57 pages).

HEAT-TREATMENT OF WATER-ABSORBING POLYMERIC PARTICLES IN A FLUIDIZED BED AT A FAST HEAT-UP RATE

The present invention relates to a method for heat-treating water-absorbing polymeric particles at a temperature equal to or above 150° C. in a fluidized bed dryer at a fast heat-up rate, the use of a fluidized bed dryer for heat-treating water-absorbing polymeric particles in continuous or batch mode as well as to the heat-treated polymeric particles obtained by the method of the present invention.

Water-absorbing polymers, i.e. polymers absorbing aqueous liquids, such as for example water, blood or urine, are important components of modern disposable hygiene articles, such as for example disposable diapers, adult incontinence garments, sanitary napkins or bandages. Particularly useful are so-called superabsorbent polymers (SAP), i.e. usually hydrogel-forming water-absorbing polymers which are able to absorb water and aqueous solutions by hydrogen bonding with water molecules in a quantity of at least 50 times their own weight (based on de-ionized and distilled water). Many SAP are able to absorb water in a quantity exceeding 100 times their weight and to retain considerable amounts of the absorbed water even under pressure.

Such water-absorbing polymers are usually prepared by polymerizing ethylenically unsaturated monomers, such as for example α,β-unsaturated carboxylic acids, e.g. acrylic acid, their sodium, potassium, ammonium salts or mixtures thereof, in the presence of usually a small amount of at least one type of cross-linker, i.e. a di- or polyfunctional monomer, such as for example N,N'-methylenebisacrylamide, trimethylolpropane triacrylate, ethylene glycol di(methacrylate) or triallylamine. These di- or polyfunctional monomers introduce a light cross-linking in the polymer chains, making the water-absorbing polymer water-insoluble, yet water-absorbing.

Powdery and particular superabsorbers are manufactured by two main methods: According to the first method, radical polymerization is carried out in an aqueous solution of the monomers (so-called solution polymerization), yielding a gel which is comminuted, dried, ground and screened out to the desired particle size.

According to the second method, the monomer (or an aqueous solution thereof) is dispersed in a hydrophobic organic solvent by means of an emulsifier or a colloid and radical polymerization takes place (so-called suspension polymerization). After aceotropically removing the remaining water from the reaction mixture, the polymer product is filtered off and dried.

In order to improve and/or fine-tune additional properties of the water-absorbing polymers, such as for example retention capacity, gel strength, absorption rate, absorbency under load etc., the ground, sieved and dried polymeric particles obtained as described above may additionally be heat-treated optionally in the presence of a surface-modifying agent. Such heat-treating processes are described for example in DE 40 20 780 C1, EP 0 979 250 B1, WO 94/20547 A1, WO 2006/082241 A2 and WO 2007/074108 A1.

Several devices and methods for heating up the polymeric particles are mentioned in these applications and patents, such as for example forced-air ovens, heated screw devices, plate dryers, fluidized bed heaters/dryers as well as contact dryers, the latter preferably being used for surface-coated SAP particles.

In contact dryers agitation and shearing may cause undesired attrition and product deterioration.

In fluidized bed dryers known for the purpose of heat-treating superabsorbent polymeric particles on the other hand heat-treating proves to be very critical in various aspects:

First, a temperature range very close to and even overlapping with the temperature range within which exothermic self-decomposition of SAP occurs (above about 200° C.) often is required for optimum heat-treating results. Depending on the conditions of heat exchange within the bed, this might lead to uncontrollable exothermic reactions and even fire, in particular, if the particles are not properly fluidized or if larger, e.g. agglomerated, particles enter the fluidized bed dryer or are formed in there. In both cases material of the water-absorbing polymer particles resides on the hot bottom plate of the fluidized bed dryer, overheats there and thus allows the exothermic reactions to start.

Second, a large portion of SAP with a particle size of below 250 μm is elutriated from the fluidized bed dryer prior to having been heat-treated properly. Accordingly, this elutriated fraction cannot simply be combined with treated material. Rather, it has to be worked up in an additional process before it can be combined with the heat-treated product or, as an alternative, it may be recycled as fines to a polymerization process. In any case, a high fraction of elutriate material is not desired since it requires additional handling, reduces the overall product yield and quality and product throughput.

Third, usually during heat-treatment the fluid retention capacity in saline solution after centrifugation as measured by the centrifuge retention capacity (CRC) significantly drops, while the adsorption against pressure (AAP) does not reach the desired level. In general, it is therefore difficult to obtain a product, which combines both, a high CRC and a high AAP. Furthermore, permeability of the heat-treated product, as indicated by its permeability under load (PUL) and saline flow conductivity (SFC), often is poor.

It was therefore an object of the present invention to provide a method for heat-treating polymeric particles with both, good absorption as well as permeability characteristics. Preferably, the method should further allow an essentially uniform heat-treatment of the polymeric particles even at elevated temperatures, without the risk of exothermically decomposing of the polymer. Preferably the method should allow heat-treating of superabsorbent polymeric particles at short residence times in a continuous mode as well.

It has now surprisingly been found that heating up the polymeric particles inside the fluidization chamber of a fluidized bed dryer at a fast heat-up rate, i.e. a heat-up rate of at least 10° C. per minute, significantly improves both product performance of the heat-treated product as well as operating efficiency of heat-treatment.

The present invention thus provides a method for heat-treating water-absorbing polymeric particles at a temperature $T_{p1}$ equal to or above 150° C., wherein said polymeric particles are heated in the fluidization chamber of a fluidized bed dryer from an initial particle temperature $T_0$ equal to or below 50° C. to said temperature $T_{p1}$ at a heat-up rate of at least 10° C. per minute.

Preferably, the heat-up rate may be at least 11, 12, 13, 14, 15, 16, 17, 18, 19, 20, 21, 22, 23, 24 or 25° C. per minute.

The particle temperature $T_{p1}$ preferably may be in the range of from 170 to 245° C., more preferably of from 190 to 235° C., including of from 195, 200, 205, 210, 215, 220 or 225 to 230° C. and of from 195 to 200, 205, 210, 215, 220, 225 or 230° C. Preferably the polymeric particles are heated from the initial particle temperature $T_o$ to temperature $T_{p1}$ in less than 20 minutes, more preferably less than 10 min, even more preferably in less than 7.5 min and even more preferably in less than 5 min. Said particle temperature is measured by at least one PTF-thermocouple residing in the middle of fluidized product with respect to the vertical direction. Suitable thermocouples are commercially available for instance under the trademark name SENSYCON from ABB Automation Products GmbH (Alzenau, Germany). Suitable thermocouples are commercially available for instance under the trademark name SENSYCON from ABB Automation Products GbmH (Alzenau, Germany).

Heat-treating the polymeric particles is achieved by contacting them with at least one gas stream having a temperature $T_g$ above 150° C. Preferably the particles are contacted with at least one hot gas stream having a temperature $T_g$ in the range of from above 150 to 320° C. inside the fluidization chamber of a drying compartment, said drying compartment comprising at least one fluidization chamber, opening downwardly in at least one lower plenum chamber through at least one gas distribution bottom plate having openings formed there through for upward gas flow from said lower plenum chamber into said fluidization chamber.

The temperature $T_g$ of the at least one gas stream preferably may be in the range of from 150° C. to 300° C., even more preferably of from 180° C. to 295° C. and most preferably of from 210° C. to 290° C., said temperature being measured by at least one PTF-thermocouple located 40 cm below the bottom plate, in a continuously operated fluidized bed dryer the thermocouple is located in the lower plenum chamber of the fluidization chamber while in a batch operated fluidized bed dryer, generally it is located in the plenum below the bottom plate, but also may be located in a duct carrying the hot gas stream to the plenum.

The superficial gas velocity of the hot gas stream in the fluidized bed preferably may be in the range of from about 0.1 to about 0.57 m/s. More preferably, the superficial gas velocity may be in the range of from about 0.15 to about 0.55 m/s, even more preferably in the range of from about 0.2 to about 0.5 m/s and most preferably in the range of from about 0.3 to about 0.4 m/s. The superficial gas velocity $v_s$ is calculated based on the afflux gas velocity $v_a$ under the bottom plate and the type of the fine hole plate for a given pressure drop:

$$V_s = v_a - v_{cor}$$

wherein $v_{cor}$ is the correction factor for a given bottom plate and a given pressure drop. The correction factor is obtained from the particular pressure drop curves for a given type of bottom sheet provided by the manufacturer of the bottom plate The afflux velocity $V_a$ in m/s is calculated according the equation $$v_a = V/(A*3600)$$

wherein V is the gas volume flow rate in m³/h at operating temperature and A is the area in m² of the bottom plate.

Employing a superficial gas velocity in said range, it is possible to treat the polymeric particles with a hot gas stream having a temperature near or even above the polymer's decomposition temperature, thus allowing particle temperatures above 200° C. and/or a very fast heat-up of the polymeric particles, e.g. a rate equal to or above 15° C. per minute, without facing the problem of product decomposition, even in continuous processes which are operated for several month.

In addition, by varying the superficial gas velocity in said range, it is possible to adjust the size and amount of small particles which are elutriated during heat-treatment according to a desired product specification thus reducing later efforts in sizing without reducing the overall product yield more than necessary.

In terms of the present invention "heat-treating" includes the thermal treatment of water-absorbing polymeric particles both in the presence and in the absence of a cross-linker for surface cross-linking (sometimes referred to as post-cross-linking) It has surprisingly been found that employing the method of the present invention, product performance of water-absorbing polymeric particles can be significantly improved by heat-treating even in the absence of a surface-modifying agent, e.g. a surface cross-linker.

In the present invention, the polymeric particles in the fluidized bed preferably are moved along an essentially horizontal longitudinal axis of the fluidization chamber during heat-treating while being transported from the product inlet to the product outlet. In fluidized bed dryers described in the state of the art for heat-treating water-absorbing polymeric particles the hot gas stream and the stream of polymeric particles flow in essentially parallel directions, e.g. in dryers of the Wurster or Glatt-Zeller type, while in the present invention the stream of polymeric particles and the at least one hot gas stream preferably essentially cross each other. The crossing angles between the direction of the product stream of polymeric particles inside the fluidization chamber and the at least one hot gas stream entering the fluidization chamber through the openings in the at least one gas distribution bottom plate from the lower plenum chamber may be in the range of from 15° to 165°, preferably of from 20° to 160°, even more preferably of from 30° to 150° and most preferably in the range of from 45° to 135°. The direction of the product stream of polymeric particles is to be understood as the direction in which the sum of polymeric particles is moving through the fluidization chamber from the particle inlet to the particle outlet and not the direction in which one specific polymeric particle is moving in the fluidized bed.

A fluidized bed dryer adapted to the method of the present invention is shown in FIG. 1 and will be described in detail below.

Using the method of the present invention and the fluidized bed dryer adapted thereto, heat-treating is possible in a safe and reliable manner even at temperatures well above about 200° C. (where exothermic self-decomposition reactions of SAP usually are observed) in continuous processes.

Furthermore, the fraction of elutriated polymeric particles may be minimized and a narrow residence time distribution of the polymeric particles in the fluidized bed dryer can be obtained which guarantees products of uniformly high performance and quality with respect to CRC, AAP as well as permeability under load (PUL) and saline flow conductivity (SFC). In addition, due to a reduction of gas flow by improvements in design and operational details of the fluidized bed dryer less energy consumption is necessary and exothermic decomposition of polymeric particles may be avoided even when employing temperatures above 200° C.

The polymeric particles preferably have a particle size in the range of from 45 to 850 µm. Preferably said polymeric particles are so-called superabsorbent particles, i.e. polymeric particles which may absorb at least 15 times their own weight of a 0,9% saline solution.

The polymeric particles heat-treated using the method of the present invention preferably are obtained by polymerizing a monomer mixture comprising at least one type of ethylenically unsaturated monomer, at least one type of cross-linker and at least one type of initiator.

Preferred ethylenically unsaturated monomers are α-,β-unsaturated acids, preferably α-,β-unsaturated carboxylic or sulfonic acids, including acrylic acid, methacrylic acid, crotonic acid, isocrotonic acid, itaconic acid, fumaric acid, maleic acid and 2-acrylamido-2-methyl-1-propane sulfonic acid. These acids can be used in the acidic form, but it is more preferred to use the α-,β-ethylenically unsaturated acids in their at least partially neutralized form as alkali metal salts and/or ammonium salts, including sodium and potassium salts.

Polymerization may be carried out using acid monomers that are either not neutralized or have been fully or partially neutralized prior to polymerization. Neutralization is conveniently achieved by contacting the aqueous monomer solution with an amount of base sufficient to neutralize between 10% and 95% of the acidic groups present in the acid monomers. Preferably the amount of base will be sufficient to neutralize between 40% and 85%, and most preferably between 55% and 80% of the groups present in the monomers. Suitable compounds that are useful to neutralize the acidic groups of the monomers include those bases that will sufficiently neutralize the acidic groups without having a detrimental effect on the polymerization process. Examples of such compounds include alkali metal hydroxides as well as alkali metal carbonates and bicarbonates.

The superabsorbent polymeric particles may preferably be obtained by polymerizing a monomer mixture comprising at least about 10 wt.-%, more preferably at least about 25 wt.-% and even more preferably of from about 45 to about 99.9 wt.-% of α-,β-unsaturated carboxylic and/or sulfonic acids, wherein said acidic groups preferably may be present at least partly in form of a sodium, potassium and/or ammonium salt.

The acidic groups are preferably neutralized to at least about 25 mol %, more preferably to at least about 50 mol % and even more preferably of from about 50 to less than 90 mol %, more preferably from about 50 to less than 80 mol %.

The monomer mixture may comprise a mixture of said preferred monomers as well. In addition, the monomer mixture may comprise additional ethylenically unsaturated monomers in an amount of up to 60 wt.-%, including for example acryl amide, methacryl amide, maleic anhydride, alkyl esters or amides of the aforementioned monomers, including for example methyl(meth)acrylate, (meth)acrylamide, hydroxyethyl(meth)acrylate and hydroxypropyl (meth)acrylate or (meth)acrylates of polyethyleneglycol methyl ether, without being limited to these.

The monomeric mixture further comprises at least one type of cross-linker for cross-linking the polymer network, i.e. a network cross-linker. Suitable cross-linkers are those which have at least two ethylenically unsaturated double bonds, those having at least one ethylenically unsaturated double bond and at least one functional group reactive towards acidic groups and those having at least two functional groups reactive towards acidic groups, or mixtures thereof.

Suitable covalent network cross-linkers include compounds having in one molecule two to four groups selected from the group consisting of $CH_2$=CHCO—, $CH_2$=C($CH_3$)CO— and $CH_2$=CH—$CH_2$—. Exemplary cross-linkers include diallylamine; triallylamine; diacrylates and dimethacrylates of ethylene glycol, diethylene glycol, triethylene glycol, propylene glycol, 1,4-butanediol, 1,5-pentanediol, 1,6-hexanediol, neopentyl glycol, trimethylolpropane and pentaerythritol; triacrylates and trimethacrylates of trimethylolpropane and pentaerythritol; tetraacrylate and tetramethacrylate of pentaerythritol; allyl methacrylate; tetraallyloxyethane and acrylates of the highly ethoxylated derivatives of trimethylolpropane or pentaerythritol having 3 to 30 ethylene oxide units, such as highly ethoxylated trimethylolpropane triacrylate or tetraacrylate and tetramethacrylate of pentaerythritol. Other suitable cross-linkers are monoallyl ether polyether monoacrylates such as polyethylene glycol monoallyl ether acrylate (PEG-MAE-AE). Particularly preferred are ester-type cross-linkers including highly ethoxylated trimethylolpropane triacrylate having in the range of from about 3 to about 30 EO-units per molecule (HE-TMPTA), allyl-type crosslinkers and cross-linkers carrying both acrylate and allyl-functions in the same molecule, such as for example polyethyleneglycol monoallyl ether acrylate (PEG-MAE-AE).

As a two- or multifunctional agent which is capable of forming cross-links by reacting with the acidic groups of the polymer backbone at elevated temperatures polyethylene glycols may be employed, preferably polyethylene glycols being liquid or pasty at room temperature (23+/−2° C.), such as for example PEG 600.

These network cross-linkers are distinguished from and not to be confused with the surface cross-linkers discussed below. Mixtures of the aforementioned network cross-linkers may be employed as well.

Said network cross-linkers render the water-absorbing polymer water-insoluble, yet water-swellable. The preferred amount of cross-linker is determined by the desired degree of absorption capacity and the desired strength to retain the absorbed fluid, i.e. the desired absorption against pressure (AAP) or the absorption under load (AUL), respectively. The cross-linker advantageously is used in amounts ranging from 0.0005 to 5 wt.-%, based on the total weight of the ethylenically unsaturated monomer used. More preferably the amount ranges from 0.1 wt.-% to 1 wt.-%. Usually if an amount of higher than about 5 wt.-% is used the polymers will have a cross-linking density that is too high and will exhibit a reduced absorption capacity. If the cross-linker is used in amounts of less than 0.0005 wt.-%, the polymer usually has a cross-linking density that is too low so that when contacted with the fluid to be absorbed the polymer becomes sticky and exhibits a poor initial absorption rate.

The network cross-linker preferably may be soluble in an aqueous solution of the ethylenically unsaturated monomer, but may be merely dispersed in said solution as well, optionally in the presence of a dispersing agent. Examples of suitable dispersing agents include carboxymethyl cellulose suspending aids, methyl cellulose, hydroxypropyl cellulose and polyvinyl alcohol. Such dispersing agents are advantageously provided at a concentration between 0.0005 and 0.1 wt.-%, based on the total weight of ethylenically unsaturated monomer.

Preferably one or more of the aforementioned cross-linkers may be employed in combination with a rather small amount of at least a small amount of a polyhydric alcohol. Preferably, the in monomer mixture additionally comprises at least one polyhydric alcohol as an additional cross-linker in an amount of at least 50 ppm, more preferably of from 100 to 1,000 ppm, based on the total weight of ethylenically unsaturated monomer. The polyhydric alcohol preferably comprises and more preferably consists of glycerin preferably used in an amount of from 100 to 1,000 ppm, based on the total weight of the ethylenically unsaturated monomer.

The monomer mixture from which said polymeric particles are obtained furthermore comprises at least one type of polymerization initiator.

A conventional vinyl addition polymerization initiator may be used in the polymerization of the water-soluble monomers and the cross-linker. A free-radical polymerization initiator that is sufficiently soluble in the monomer solution is preferred to initiate polymerization. For example, water-soluble persulfates such as potassium persulfate, ammonium persulfate, sodium persulfate and further alkali metal persulfates, hydrogen peroxide and water-soluble azo-compounds such as 2,2'-azobis-(2-amidinopropane) hydrochloride may be used. So-called redox initiator systems such as hydrogen peroxide or sodium persulfate which can be used as oxidizing component can be combined with reducing substances such as sulfites, amines or ascorbic acid. The amount of initiator used preferably may range of from 0.01 wt.-% to about 1 wt.-%, preferably of from about 0.01 wt.-% to about 0.5 wt.-% based on the total weight of the ethylenically unsaturated monomer.

In addition, the monomer mixture may comprise one or more chelating agents to control the rate of initiation and polymerization which otherwise may rise to an undesired level due to impurities present in the monomer mixture, such as for example heavy metal ions, in particular iron ions. The chelating agent preferably may be selected from organic polyacids, phosphoric polyacids and salts thereof. Preferably, the chelating agent may be selected from nitrilotriacetic acid, ethylene diamine tetraacetic acid, cyclohexane diamine tetraacetic acid, diethylene triamine pentaacetic acid, ethyleneglycol-bis-(aminoethylether)-N,N,N'-triacetic acid, N-(2-hydroxyethyl)-ethylene diamine-N,N,N'-triacetic acid, triethylene tetraamine hexaacetic acid, tartaric acid, citric acid, imino disuccinic acid, gluconic acid, and salts thereof. The most preferred chelating agent is the pentasodium salt of diethylene triamine pentaacetic acid, commercially available in the form of an aqueous solution from The Dow Chemical Company under the trademark name Versenex™ 80.

In addition, the monomer mixture may comprise grafting polymers such as, for example, polyvinyl alcohol, starch and water-soluble or water-swellable cellulose ethers. When such grafting polymers are employed they may preferably be used in amounts of up to about 10 wt.-%, based on the ethylenically unsaturated monomer.

Furthermore, the monomer mixture may comprise recycled fines of superabsorbent polymers. As fines are considered those particles which are too small for the desired application as defined by the product specification. Fines are generated by grinding the dried polymer gel after polymerization, or by attrition of dry polymer. Said undesired product fraction is, therefore, removed from the polymer, but may be recycled by adding it to a monomer mixture prior to polymerization.

The fraction of fines can be determined by sieving using EDANA Standard Test Method WSP 220.3(10). Fines can also be obtained from the elutriated fraction in a method for heat-treating SAP particles in a fluidized bed dryer, preferably in the method of the present invention. By the hot gas stream particles may be elutriated having a diameter of up to about 250 μm. Polymer particles having a particle size of less than 250 μm, or preferably less than 200 μm are defined as fines in accordance with the present invention.

Furthermore, other additives may be added to the monomer mixture. Said other additives may be selected, for example, from alkali metal chlorates, water insoluble organic or inorganic powders such as water insoluble metal oxides like silica or zinc oxide, surfactants, dispersing aids, agents to control odor, like silver salts, water soluble salts metal like aluminum sulfate or lactate, magnesium or calcium salts or further processing aids like modified non ionic polypropylene waxes, without being limited to them.

Suitable methods for polymerizing such monomer mixtures to obtain water-absorbing polymeric particles, in particular SAP particles, are well known to a person skilled in the art. Preferably, the polymeric particles heat-treated in the method of the present invention are obtained by polymerizing a monomer mixture according to the method described in co-pending application EP 10 003 452.9.

Polymerization may take place in aqueous solution or in dispersed phase, i.e. as solution or suspension polymerization, both in batch or continuous mode.

In particular if polymerization had been carried out in aqueous solution, the obtained polymer preferably is comminuted, for example by grinding and may optionally be sieved to remove particles of a particle size smaller than 45 μm or larger than 850 μm prior to heat-treatment.

In addition, said polymeric particles preferably are dried before subjecting them to the method for heat-treating according to the present invention.

Preferably, the polymeric particles heat-treated in the method of the present invention comprise a residual amount of water being less than 12 wt.-%, more preferably being in the range of from 0.5 to 6 wt.-% and even more preferably being in the range of from 0.5 to 5 wt.-%, based on the whole composition, as determined by EDANA Standard Test Method WSP 230.3(10) when subjected to the heat-treatment.

In the lower plenum chamber of the fluidized bed dryer the at least one hot gas stream preferably is directed at the at least one gas distribution bottom plate in a direction essentially orthogonal to the horizontal longitudinal axis in which the polymeric particles in the fluidized bed are moved along during heat treating in a continuously operated fluidized bed dryer. In terms of the present invention, the term "essentially orthogonal" includes any angle being in the range of from 60 to 120°.

The bottom plate used in the method of the present invention in a continuously operated fluidized bed dryer preferably is a perforated plate with a specific hole shape which differs from ordinary round holes with cylindrical shape and passage direction. The holes of said perforated bottom plate preferably are rather triangular to semi-ellipsoidal with conical openings in passage direction. Preferably, the perforated plate used as a bottom plate or a part thereof is a fine-hole sheet (in contrast to slotted hole sheets) or an assembly of fine-hole sheets. Suitable fine-hole sheets are commercially available under the trademark name CONIDUR® from Hein, Lehmann, Trenn- and Fördertechnik GmbH (Krefeld, Germany). The special directed shape of the holes in these sheets, having a horizontal air flow component, enables directing the polymeric particles along an essentially horizontal longitudinal axis of a fluidization chamber. Instead of or in addition to such perforated bottom plates with directed holes, vibrated drying compartments may be used to move the polymeric particles along an essentially horizontal longitudinal axis of the fluidization chamber during heat-treating as well.

After passing the at least one gas distribution bottom plate the at least one hot gas stream enters the fluidization chamber, wherein it comes into contact with the polymeric particles, both heating and fluidizing them. Due to the directed holes which are preferably used in the gas distribution bottom plate, the at least one hot gas stream may pass the stream of polymeric particles moved along the essentially horizontal longitudinal axis in the fluidization chamber in an angle of from 15 to 165°, preferably of from 30 to 150°, more preferably of from 45 to 135°, even more preferably of from 60 to 120° and most preferably of from 75 to 105°.

In a fluidized bed dryer operated in a batch mode fine-hole sheets without a directed hole shape are preferred.

In particular in a continuously operated fluidized bed dryer preferably more than one hot gas stream may be contacted with the polymeric particles in the method of the present invention. Preferably the polymeric particles are contacted inside the fluidized bed dryer first with a gas stream having a temperature $T_{g1}$ in the range of from 100 to 320° C. for a fast heating up and then with a gas stream having a temperature $T_{g2}$ in the range of from 100 to 280° C. for maintaining the temperature during heat treatment. Accordingly, the fluidization chamber of a continuously operated fluidized bed dryer preferably may have a heating up zone and at least one further zone for maintaining the temperature.

The first gas stream may be used to heat the polymeric particles to the desired particle temperature $T_{p1}$ in a short time. The temperature of said first gas stream $T_{g1}$ preferably may be set to more than 30° C. or even more than 50° C. above the desired particle temperature $T_{p1}$ to ensure a fast heat-up rate. However, if said particles are contacted with a gas stream having a temperature of about more than 30° C. or even more than 50° C. above the desired particle temperature for too long a time, decomposition may occur. Thus, once the particles have (almost) reached the desired particle temperature $T_{p1}$, it is preferable to contact the polymeric particles with a second gas stream having a temperature $T_{g2}$ which is below $T_{g1}$, but preferably still above $T_{p1}$. Said temperature $T_{g2}$ preferably is in the range of from 150 to 280° C. and preferably does not exceed the desired particle temperature $T_p$ by more than 20° C., even more preferably not by more than 10° C.

After having reached the temperature $T_{p1}$ the polymeric particles may be kept at said temperature for the rest of the total residence time, i.e. the time they stay in the fluidization chamber of the fluidized bed dryer, or they may be heated to and kept at a temperature $T_{p2}$, wherein $T_{p1}$ and $T_{p2}$ are different from each other, but both preferably are in the range of from 170 to 245° C., more preferably of from 190 to 235° C.

The total residence time of the polymeric particles in the fluidized bed dryer of the present invention, i.e. the mean time period a polymeric particles is present in both the heating up and the temperature maintaining zone of the fluidization chamber, preferably may be in the range of from about 2 min to several hours, more preferably of from about 4 to about 60 min, even more preferably of from about 10 to about 40 min. The total residence time comprises a heat-up phase and the actual heat-treatment time. The heat-up phase, i.e. the first period of time during which the polymeric particles are heated up to the desired temperature $T_p$ using a gas stream having a first temperature $T_{g1}$ well above the desired product temperature $T_p$, preferably lasts for about a few seconds, e.g. 2 seconds to about 10 min, more preferably for 1 to about 9 min and most preferably for about 2 to about 8 min. Once the product has reached the desired particle temperature $T_p$, the actual heat treatment time begins and the temperature of the gas stream $T_{g2}$ may be adjusted accordingly to hold the desired product temperature. The actual heat treatment preferably lasts for about 1 to 60 min, more preferably for about 2.4 to 45 min and even more preferably for about 5 to 30 min.

The gas stream having the temperature $T_{g1}$ and the gas stream having the temperature $T_{g2}$ may have the same or a different composition and may be supplied to the lower chamber through the same or different inlets. In addition, the polymeric particles may be treated with one or more further gas streams having a temperature $T_{gn}$, wherein n is 3, 4, 5 etc., differing from $T_{g1}$ and $T_{g2}$.

The method of the present invention allows to obtain heat-treat particles with a narrow residence time distribution. Preferably at least 50 wt.-%, more preferably at least 70 wt.-% and most preferably at least 80 wt.-% of the polymeric particles discharged from the fluidization chamber of the fluidized bed dryer after heat-treatment were heat-treated for the scheduled heat-treatment time t±5%.

In the method of the present invention the pressure drop across the gas distribution bottom plate, i.e. the difference between the pressure at the plenum side of said plate and the pressure at the side of the fluidization chamber, preferably may be in the range of from 100 to 900 Pa, more preferably of from 150 to 400 Pa and most preferably between 200 and 300 Pa. The bottom plates' manufacturers provide pressure drop curves to select a suitable bottom plate to obtain the desired pressure drop, taking into account the approaching gas velocity and the operating temperature. The total pressure drop across both, the bottom plate and the fluidized bed, preferably may be in the range of from 2,500 to 5,000 Pa. The total pressure drop is measured by at least one differential pressure transmitter placed 60 cm below the bottom plate with respect to the atmospheric pressure outside the fluidized bed dryer. Suitable differential pressure transmitters are commercially available for instance under the trademark name ROSEMOUNT from Emerson Process Management GmbH & Co. OHG (Wessling, Germany). The pressure drop depends inter alia on the gas distribution bottom plate used, the gas temperature and the afflux velocity, which is well known to a person skilled in the art. Guides for selecting a particular perforated bottom plate to obtain a particular pressure drop at a given temperature and afflux velocity is available from the manufactures of said perforated bottom plates.

In the method of the present invention the height of the fluidized bed preferably may be in the range of from about 10 to about 80 cm, more preferably of from about 30 to about 60 cm. The height of the fluidized bed may be controlled inter alia by the volume of approaching gas per hour and the pressure drop, which is well known to a person skilled in the art.

As a gas, any gas inert toward a reaction with the polymer under the conditions employed may be used, such as nitrogen, carbon dioxide, noble gases, air and the like, as well as mixtures thereof. Steam may be applied as well, provided that condensation of water and any contact of the polymeric particles to be heat-treated with a condensate are prevented. For economic reasons, air is the preferred gas in the method of the present invention. After passing and fluidizing the bed of polymeric particles, the gas stream is filtered and at least a part of it preferably may be recycled by redirecting it into the fluidization chamber, while another part preferably may be discharged to the atmosphere.

Using the method of the present invention it is possible to treat (i) "untreated" polymeric particles, i.e. polymeric particles that have not been brought into contact with any further solid or liquid substance after having been formed by polymerization, drying, grinding and sieving, (ii) polymeric particles re-wetted on their surface using pure water, (iii) polymeric particles treated with a coating solution not comprising any surface cross-linkers and (iv) polymeric particles treated with solutions comprising surface cross-linkers.

Preferably, a solution comprising at least one organic and/or inorganic cross-linker may be applied to the surface of the polymeric particles before said particles are heat-treated according to the method of the present invention. Said solution preferably is applied to the surface of said polymeric particles by spraying, more preferably by spraying at a temperature in the range of from 0 to 99° C.

Surprisingly it has been found that in heat-treating product characteristics may be improved in the absence of surface cross-linkers by re-wetting the surface of the polymeric with an aqueous solution particles prior to heat-treating them, preferably by using "pure" water, like distilled water, de-ionized water or tap water, i.e. water not comprising any additional ingredients like toxic, cross-linking or other reacting components in substantial quantities, i.e. preferably in an amount of less than 100 ppm. Thus, in the method of the present invention before being heat-treated, the polymeric particles are wetted at their surface by an amount of water which preferably is in the range of from 0.3 to 7 wt.-%, preferably of from 1 to 5 wt.-% and more preferably of from 1.5 to 3.5 wt.-%, based on total weight of polymeric particles.

Surprisingly it has been found that even better results are obtained if the step of applying water or a solution comprising a coating agent and/or a surface cross-linker is carried out in a two-step procedure, i.e. if water or the respective solution is applied to the particles before fluidizing and heat-treating them in a fluidized bed dryer and not inside a fluidized bed dryer, using for example a fluidized bed dryer of a Wurster or Glatt-Zeller type.

Any liquid or solution has to be essentially homogeneously distributed on the surface of the polymeric particles. One preferred method is to add the liquid/solution onto the polymeric particles within a suitable mixer, preferably by spraying it onto the agitated polymeric particles. Various suitable mixers are described in the literature, including, for example, screw mixers, paddle mixers, disc mixers, ploughshare mixers and shovel mixers. Particularly preferred are vertical mixers, in particular ploughshare mixers and shovel mixers. Suitable mixers are commercially available under the trademark names Lödige® mixers, Bepex® mixers, Nauta ° mixers, Processall® mixers and Schugi® mixers. Suitable spray nozzles and atomizing systems are known in the state of the art as well and are described, for example in Zerstäubungstechnik, Springer Verlag, VDI-Reihe, Günter Wotzmer (2002). Mono- as well as polydispersed spraying systems may be used, including pressure nozzles, rotary atomizers, ultrasonic atomizers and impact nozzles, without being limited to these.

The coating solution preferably may comprise a surface cross-linker, which preferably is selected from the group consisting of polyhydric alcohols, polyglycidyl compounds, cyclic carbonates, polyamines, alkoxysilyl compounds, polyaziridines, polyamidoamines, oxazolidones, bisoxazolines, water-soluble multivalent metal salts, including lactates, hydroxides, carbonates or bicarbonates of magnesium, calcium, barium or aluminum, or mixtures thereof, preferably aluminum lactate, metal oxides or mixtures thereof in an aqueous solvent, i.e. in water or a mixture of water and at least one water-soluble organic solvent.

In terms of the present invention an aqueous solvent comprises both "pure" water as well as a mixture of water and a water-soluble co-solvent, including $C_1$-$C_6$ alcohols, such as methanol, ethanol, n-propanol, isopropanol, n-butanol, sec-butanol and tert-butanol, $C_2$-$C_5$ diols, including ethylene glycol, 1,2-propylene glycol, 1,3-propylene glycol and 1,4-butanediol, acetone and the like.

The surface cross-linker preferably is applied to the polymeric particles in the form of an aqueous solution, said solution comprising of from 100 to 10,000 ppm, more preferably of from 500 to 5,000 ppm of one or more surface cross-linkers. Preferably an amount of from about 0.3 to about 10 wt.-%, more preferably of from about 1 to about 6 wt.-% and even more preferably of from about 2 to about 4 wt.-% of said aqueous solution is added to the polymeric particles, based on the total weight of the polymeric particles. Co-solvents or any other liquid or solvent additives might be added to the polymeric particles as part of the aqueous solution or in a separate step before or after adding the aqueous solution comprising the surface cross-linker. Furthermore, the coating solution may comprise additional components, such as for example deagglomerating aids including for example polyoxyethylene (20) sorbitan monolaurate.

After being treated with the coating solution as described above, the coated polymeric particles may immediately be subjected to the method of heat-treating according to the present invention or they may be held at a temperature of from 0 to 99° C., preferably at room temperature (+/−23° C.), before being subjected to the method of heat-treating according to the present invention. Said incubation preferably is carried out under mixing in a separate vessel, i.e. not in the fluidized bed dryer.

In many cases, such a hold-time (incubation) ensures a diffusion of the coating solution through the surface of the particles and leads to a more homogenous distribution of the cross-linker on the surface of the polymeric particles. During holding the temperature preferably is in the range of from 0 to 99° C., and the hold time preferably may be in the range of from 10 seconds to 10 hours. A hold time of less than 10 seconds usually cannot ensure a homogeneous distribution of the coating solution and/or a sufficient penetration of the coating solution into the particle surface. In addition, the coated polymeric particles still may be too wet to allow an efficient fluidization in the fluidized bed dryer. If, on the other hand, the hold time exceeds 10 hours, the surface cross-linker usually diffuses into the core of the polymeric particles, i.e. too far away from the surface, leading to an inferior product quality after subsequent heat-treatment.

The present invention furthermore provides a fluidized bed dryer specifically adapted to be used in the method of the present invention. Thus, the present invention furthermore relates to the use of a fluidized bed dryer for heat-treating water-absorbing polymeric particles in continuous or batch mode, preferably in a method according the present invention as described above, said fluidized bed dryer comprising i) a drying compartment with a substantially horizontal longitudinally axis, said drying compartment comprising a fluidization chamber, opening downwardly in a lower plenum chamber through at least one gas distribution bottom plate having openings formed there through for upward gas flow from said lower plenum chamber into said fluidization chamber,
ii) a particle inlet for supplying the particles to be treated to the fluidization chamber,
iii) a particle outlet for removing the treated particles from the dryer,
iv) at least one gas supply inlet in the plenum for supplying gas to the plenum, and
v) at least one gas outlet to discharge the gas stream from the drying compartment after having fluidized and passed the particle bed.

In particular when freshly surface-coated polymeric particles which are still tacky on the surface are fed into a fluidized bed dryer, agglomeration of said particles may occur, leading to insufficient product fluidization. In consequence, polymeric particle material resides on the hot gas distribution bottom plate and overheats, thus allowing an exothermic decomposition to start by blocking any proper heat exchange due to disturbed fluidization. Finally this may lead to product decomposition and even fire in some cases. These risks are avoided using the fluidized bed dryer of the present invention for heat-treating water-absorbing polymeric particles, an example of which is shown in FIG. 1.

The fluidized bed dryer in general comprises a fluidization chamber 1, a perforated bottom plate 3, preferably a fine-hole plate, (e.g. a CONIDUR® plate) and a hot air distribution chamber (the plenum 2) underneath the bottom plate 3. The dryer is equipped with a product charging 5 and discharging system 6, at least one hot gas heater 7, suitable ducts for the hot gas 9 and a vent system for the gas stream which has passed the fluidization bed. Said vent system contains a suitable filter system 8 to recover the elutriated polymer particles in the vent gas stream. Preferably the system possesses more than one gas heater 7a and 7b in order to be able to set different temperatures for different zones of the fluidized bed.

The gas, after being heated up to the desired temperature, is guided into the plenum 2 and is evenly distributed there so that it will homogeneously flow through the openings of the bottom plate 3 at the desired velocity to homogeneously fluidize and heat the polymeric material in the fluidization chamber 1. After fluidizing and passing the polymer layer in the fluidized bed, the gas stream is filtered and one part of it is being recycled, while the other part is being discharged to the atmosphere.

For economic reasons, the heat-treatment of the polymeric particles is preferably performed in continuous mode, however, the fluidized bed dryer may be operated in batch mode as well.

The fluidized bed dryer is usually made of steel, but in principle may be made of any inert material that resists the high temperature used and is mechanically stable. The fluidization chamber may be of cylindrical, conical or rectangular shape. Particularly suitable are dryers of rectangular shape. Suitable dimensions for a production-scale, rectangular fluidization chamber may be for example a length of from about 4 to about 8 m, preferably of from about 5 to about 7 m and more preferably of from about 5.75 to about 6.25 m. The width for example may range of from about 0.7 to about 2.1 m, preferable of from 1.0 to 1.8 m and more preferably of from 1.3 to 1.5 m. The height of the fluidization chamber preferably may be in the range of from about 1 to 3 m, preferably of from about 1.5 to 2.5 m and more preferably of from about 1.85 to about 2.15 m. The ratio of the length of the gas distribution bottom plate to its width preferably may be in the range of from 3 to 5.5 and the ratio of the area of said bottom plate to the height of the fluidization chamber preferably may be in the range of from 2.5 to 5.5.

At continuous mode, the product is continuously fed, optionally by gravimetric or volumetric flow, into one end of the optionally rectangular fluidization chamber from where it is moved either by specific vibration and/or by the directed gas flow provided by the specific design of the holes of the bottom plate along the fluidization chamber to the opposite side from where it may be discharged into an adjacent cooling chamber. Alternatively, a separate product cooler might be used. After cooling, the product is collected from the cooling chamber or the product cooler and may be packed for shipping or may be processed further.

The bottom plate preferably may be at least one fine-hole sheet as already described above and serves to retain the particle in the fluidization chamber and to distribute the hot gas stream. It separates the plenum and the fluidization chamber and may be made of either metal or of any other heat resistant material that provides the needed stability and is perforated to allow the hot gas stream to pass. The holes preferably are of specific size and shape as described above to prevent the particles to pass through the plate and enter the plenum. The number of the holes per area and the open section they provide in the bottom plate are such that the needed volume of gas will pass the openings with the required flow speed in order to transfer the required energy to the product and to fluidize the product layer on the plate.

The bottom plate of the fluidized bed dryer may be made of one single sheet, having a uniform structure with respect to hole size, hole design, number of holes per area etc. over the whole area, or the bottom plate might be assembled by more than one segment, wherein each segment optionally may be different in its respective design to provide specific fluidization and product movement in different zones of the fluidized bed dryer.

The thickness of the bottom plate preferably may be in the range of 0.3-5 mm. The openings in the plate may be of spherical, rectangular, ellipsoidal etc. shape and preferably may have a shape suitable to direct of the gas stream and hence the fluidized product in the desired direction. Their size depends on the particle size of the product to be treated and the required conditions and usually is in the range between 0.1 and 0.5 mm, preferably in the range of from 0.2 to 0.4 mm and even more preferably in the range of from 0.3 to 0.35 mm. Size, number and design of the holes have to be selected such that the gas velocity and the pressure drop of the fluidization gas as it passes the plate are in the appropriate range for optimal and homogeneous fluidization, which is well known to a person skilled in the art.

As said before, it is essential, that the entire material in the fluidization chamber is homogeneously and permanently fluidized over the whole bottom plate area. The exothermic self-decomposition of the polymeric particles can only reliably be controlled up to a temperature of about 240° C., if the product bed is homogeneously fluidized, which assures proper heat-exchange and prevents auto-acceleration of the decomposition.

Not only polymer inside the fluidization chamber can decompose, but also polymer material accidentally entering the plenum, where it is not fluidized, is at high risk to be ignited. Product in the plenum can furthermore block the openings of the bottom plate from underneath when blown against said plate and hence disturb fluidization above the plate. Any care must be taken not to allow product to leak into the plenum either from the fluidization chamber above, or by being carried in by the recycled air stream due to defect or improper vent stream filters. Proper instrumentation like pressure monitoring in the plenum below the bottom plate and/or fines monitoring in the main air circulation line helps to indicate timely any process difficulties which is essential for avoiding possible product decompositions.

Large product particles or any product agglomerates, which enter the fluidization chamber or which are being formed in said chamber will stay non-fluidized due to their weight. They will stay in contact with the hot bottom plate, decompose and possibly ignite if not removed timely.

Accordingly such large particles or lumps must be excluded from the system or prevented from being formed inside, as described below.

The polymeric particles are continuously charged into the fluidization chamber at the desired rate, which may be controlled by a rotary valve or any other suitable system. The feed polymer preferably may have a temperature of about 50° C. or less as it enters the feed zone of the fluidized bed. In the hot environment of the feed zone, the particles rapidly loose most of their residual moisture (i.e. water in an amount of less than 12 wt.-%, usually about 0.5-6 wt.-% by the EDANA method WSP 230.3(10)). The moisture is usually absorbed by the hot gas and discharged by the vent stream. Any cool zones or surfaces, which might be present inside the chamber, provide the risk of condensing the moisture, thus generating wet spots to which polymeric dust or particles could stick, forming agglomerates or lumps. Those lumps can occasionally fall off and drop down to the bottom plate. That part of the feed system (e.g. feed tube and rotary valve) that is located inside the chamber or at least in close contact to it is permanently cooled by the feed material and can, therefore, provide cool surfaces for condensation and agglomerate or lump formation. The cool product stream itself provides a cool zone for condensation and thus a risk for undesired agglomeration. In order to prevent agglomerate formation in the feed area appropriate precautions should be taken. First, a device may be installed which helps to homogeneously distribute the feed stream over a wider area of the hot fluidized bed. Second, that part of the feed system (e.g. feed tube and rotary valve) which is located inside the chamber or at least in close contact to it may be equipped with a trace heating to prevent the surface from cooling down. Furthermore, a dry-air stream may be directed to the inlet area to additionally prevent condensation to occur.

Figure 2:
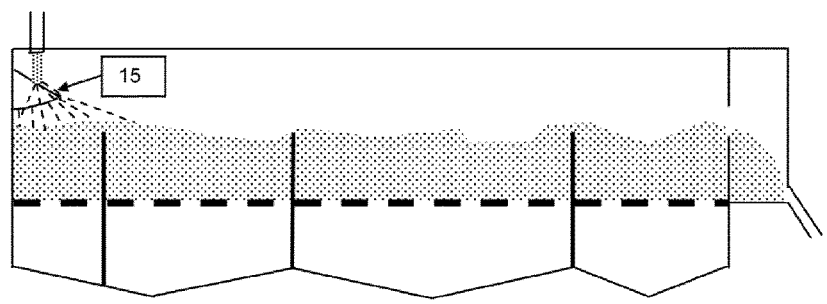

A special device for homogeneous feed distribution may be for example in the form of a "Chinese hat" 15 which is installed in the fluidization chamber directly below the particle feed stream inlet. Said device comprises a semi-conical plate lined with a jacket for electrical tracing, as shown in FIG. 2.

For reliable operation the fluidized bed dryer of the above specified dimensions may be charged with a product feed stream from about 50 to about 2000 kg/h, preferably from about 100 to about 1000 kg/h, more preferably from about 125 to about 450 kg/h and with a total hot gas volume stream from about 300 to about 3000 kg/h, preferably of from about 500 to about 2500 kg/h, both per m² bottom plate. The gas stream, after passing the product layer, still contains a considerable fraction of energy, which preferably is reclaimed for heating the particles. Therefore, after separating the elutriated matter by filtration in a suitable temperature resistant filter or cyclone, a part of the gas stream is send back (recycled) to the heaters. However, as the moisture content in the hot gas stream increases by the evaporated water from the feed material, a portion of the gas stream should be discharged to the vent stream and should be replaced by fresh, dry gas. The fresh gas may be used to fluidize and cool the hot SAP in the cooling chamber before being combined with the hot gas stream that has passed the product layer. The ratio of the discharged gas volume from the gas volume leaving the fluidization chamber is in the range of from about 10 to about 40%, preferably in the range of from about 20 to about 30%.

Usually a fraction of 1-15 wt.-% of the product stream is carried away (elutriated) by the gas stream and needs to be separated from the gas. It is very important to efficiently and reliably separate all of the particles from the gas stream as they would otherwise be carried by the recycled hot-air stream into the plenum and concentrate in there by time. Separation from the gas stream may be achieved by one or more cyclones, appropriate filters or a combination of both.

To successfully separate the fines from the gas stream, a filter cyclone equipped with special polyimide or Teflon® filters suitable for temperatures above 190° C. may be used. The pressure drop through the filter, i.e. the pressure before and after the filter, is defined by the type of filter used and the filter cleaning interval.

Too high a pressure drop may have a negative impact on the total air circulation flow rate, resulting finally in insufficient fluidization and heat transfer efficiency. In order to prevent product decomposition, the proper function of the filters should to be controlled on a continuous basis.

The heat-up rate of the polymer depends on the energy intake rate provided by the hot gas stream and on thickness of the product bed. Due to the above discussed limitations with respect to the energy intake rate (gas temperature and gas velocity), the heat-up rate is usually controlled by the bed thickness. Preferred thicknesses of the fluidized bed are dependent on the size and geometry of the fluidized bed dryer. A plant scale, continuously operated, rectangular fluidized bed dryer preferably may have a bed height (fluidized) in the range of 10 to 80 cm, preferably from 30 to 60 cm. The bed height preferably may be controlled by a weir at the discharge end of the fluidization chamber. If the bed height is above 80 cm, the heat-up rate would be too small, resulting in insufficient product quality. Too low a bed height give insufficient pressure drop over plenum and product layer, thus causing inhomogeneous fluidization.

The heat-up of the fluidized bed can also be accelerated by energy input by irradiation. As an example one or more UV or IR irradiation sources may be mounted into the fluidization chamber. Preferably said sources may be mounted in the feed zone of the chamber in order to accelerate the product heat-up rate. Such heat sources are particularly desired when operating conditions shall be applied under which the hot-gas stream cannot provide sufficient heat input for the appropriate heat-up rate.

It is preferred that each single particle gets about the same treatment in the fluidization chamber and, therefore, it is desirable that each particle has the same residence time in said chamber. Hence a quasi plug flow is desirable. In a standard fluidization chamber considerable back-mixing occurs, resulting in an undesirable wide residence time distribution of the product, so that a fraction of particles is discharged from the fluidized bed dryer before it is heat-treated for the desired range of time, while another fraction is exposed to the high temperature being at the polymer's decomposition limit for a too long time.

Figure 3:
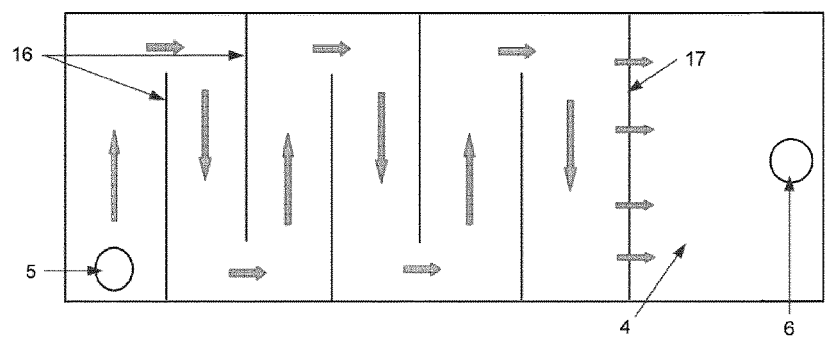

In order to minimize back-mixing, baffle plates 16 may be inserted into the fluidization chamber 1 to achieve a forced particle stream direction and a quasi plug-flow providing a narrow residence time distribution in the fluidization chamber (FIG. 3).

The fluid bed height may be controlled by an adjustable weir 17 at the discharge side of the fluidization chamber 1. The fluidized bed dryer preferably further comprises a cooling chamber 4 adjacent to the fluidization chamber 1 to which the heat-treated polymeric particles are discharged after having passed said fluidization chamber 1. Preferably the cooling chamber 4 is partly separated from the fluidization chamber 1 by the above mentioned weir 17 so that the overflowing material enters directly the cooling chamber 4, where it is cooled down to a temperature of below 50° C.

(FIG. 3). The cooling chamber may be equipped with a fresh gas blower and a heat exchanger 12, e.g. a shell and tube cooling water heat exchanger (FIG. 1). The fresh cooling air, after it has passed and cooled the hot product in the cooling chamber 4, is fed into the hot vent stream leaving the fluidized bed dryer.

For efficient heat-treatment of polymeric particles in a fluidized bed dryer the ratio of gas flow to product flow must be adjusted carefully to obtain the desired heat transfer, product quality, minimized fines elutriation and to guarantee the appropriate product fluidization and safe operation. In order to meet all these requirements, continuously operated production scale fluidized bed dryers preferably may be fed with a product stream of 100-2000 kg/h and a hot gas stream of 300-3000 kg/h, both per $m^2$ bottom plate.

A production-scale fluidized bed dryer for example may be operated under the following conditions: bottom plate area Conidur®: approximately 8.4 $m^2$, total air flow: approximately 7000-9000 kg/h and product throughput: approximately 2400-2500 kg/h.

The fluidized bed dryer might be divided in two or more sub-zones (indicated by vertical lines in the drying compartment in FIGS. 1 and 2) in which the operating conditions may be set and controlled individually. Each zone may have a dedicated gas heating system 7a to 7x and hot gas stream 9a to 9x. Using such sub-divisions specific profiles, such as e.g. a specific temperature profile, individual bed heights etc. may be targeted along the fluidized bed dryer.

The first zone preferably serves to achieve the fast heat-up of the polymeric particles. Therefore, the hot inlet-gas flow rate and the temperature of the flow 9a should be set to the acceptable maximum, while the conditions in the second zone (flow 9b) can be set more moderate, as this zone only serves to maintain the fluidized product at the desired heat-treatment temperature. The separation of the zones is achieved by two distinct hot air feed systems which are separately controlled.

Alternatively a separation may be achieved as well by using only one burner providing a high temperature gas stream, then dividing said hot gas stream and mixing the part of the stream for the second zone with cool fresh gas. For heating the gas stream fed into the plenum (feed stream) electrical heaters, gas heaters, pressures steam heat exchangers or any other heater with appropriate heat exchangers may be used.

In the case that decomposition of the polymeric particles occurs, CO and $CO_2$ gases are released. In order to detect undesired decomposition immediately, a sensitive IR $CO/CO_2$ detection system may be installed to monitor the $CO/CO_2$ concentration at least in the vent stream which leaves the fluidization chamber. Preferably, the concentrations in the gas feed stream and in the vent stream are continuously monitored and the difference of both is calculated. In case that the $CO/CO_2$ levels exceed a trigger concentration, the system may provide an alarm via the process control system so that immediate actions can be taken. For example the fluidized bed dryer may be flushed with nitrogen (11 in FIG. 1) in this case in order to immediately suppress uncontrollable decomposition or even fire inside the fluidized bed dryer. In case of detecting a possible decomposition, the system will be cooled down, flushed with nitrogen and as soon as safe conditions are achieved, the system can be opened following special safety procedures and instructions.

The pressure drop across the fine-hole plate and the fluidized product may be permanently monitored as well. An undesired pressure rise indicates blockage of the hot air stream by either clogged fine holes of the fine-hole plate or by deposits, which have formed on the fine-hole plate. At a certain level an alarm is triggered and immediate actions may be taken required in order to prevent product decomposition to occur.

Preferably, the pressure drop through the filters may be monitored continuously for safety purposes as well. On the one hand, too high a pressure, which is usually obtained by filter blockage, bears the risk of blocking the hot-gas stream leading to insufficient product fluidization and, on the other hand, a low pressure drop, which may appear suddenly, is usually an indication for damaged filter tissue. In this case particular material may leak into the hot-gas stream and may be carried into the plenum under the fine-hole plate, which may lead to product decomposition if no appropriate action is taken.

Accordingly, the fluidized bed dryer used in the present invention preferably further comprises one or more of (i) a device for heating the particle inlet, (ii) a device for separating elutriated fines from the gas stream discharged from the fluidization chamber, preferably in the form of one or more cyclones, filters or a combination thereof, (iii) baffle plates inside the fluidization chamber to minimize backmixing; (iv) means for monitoring the pressure drop across the gas distribution bottom plate, the fluidized bed and/or the device for separating elutriated fines from the gas stream, (v) at least one irradiation source inside the fluidization chamber, (vi) means for measuring the concentration of carbon monoxide and/or carbon dioxide in the gas stream leaving the fluidization chamber (vent stream) and optionally the hot gas stream fed into the plenum (gas feed stream), (vii) means for flushing at least the drying compartment of the fluidized bed dryer with nitrogen or a noble gas.

Using the method of the present invention and the specifically adapted fluidized bed dryer continuous heat-treatment of water-absorbing polymeric particles in a fluidized bed can be carried out whereby products of high performance and quality are obtained. In particular significant improvements in product quality with respect to characteristics such as CRC, CRC to AAP (or CRC to AUL) ratio, SFC and PUL are obtained, as demonstrated in the following examples.

Accordingly, a further object of the present invention is the heat-treated polymeric particles obtained by the method of the present invention.
using the method and the specifically adapted fluidized bed dryer of the present invention a reduced fraction of elutriates and a reduced energy consumption is obtained during heat treatment.

LIST OF FIGURES

FIG. 1 shows a fluidized bed dryer specifically adapted to the method of the present invention. Said fluidized bed dryer comprises a drying compartment formed of a fluidization chamber 1, opening downwardly in a plenum chamber 2 through a gas distribution bottom plate 3. A cooling chamber 4 is located adjacent to the drying compartment at said end of the drying compartment, which is opposed to the product inlet of the product charging system 5. The cooling chamber is equipped with a heat exchanger 12. From said cooling chamber the product is discharged by a product discharging system 6. To heat the gas stream entering the plenum 2 of the drying compartment, gas heaters 7a and 7b are used, from which a hot gas stream is fed into the drying compartment. After passing the fluidized bed in the fluidization chamber 1 the vent stream is directed into a filter system 8, where the elutriated polymeric particles are separated from the gas and are recovered. A part of the filtered vent stream 9 is recycled to the gas heaters 7a and 7b while the other part 10 is discharged to the atmosphere. The fluidized bed dryer furthermore may be equipped with means 11 for flushing the drying compartment with nitrogen or a noble gas. The fluidized bed dryer furthermore comprises means for introducing dry gas 14 into the cooling chamber 4.

FIG. 2 illustrates a special device 15 for homogeneous feed distribution in the fluidization chamber 1.

FIG. 3 illustrates the use of baffle plates 16 in the fluidization chamber 1 for obtaining a quasi plug flow of polymeric particles. A weir 17 serves to adjust the height of the fluidized bed in the fluidization chamber 1 and separates the fluidization chamber 1 from the cooling chamber 4.

Figure 4:
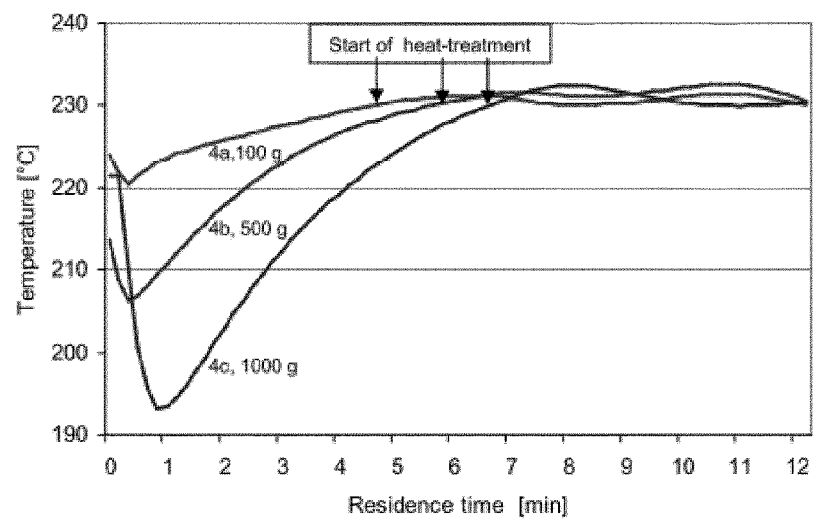

FIG. 4 illustrates the impact of particle amount on heat-up rate according to examples 4a-4c.

LIST OF REFERENCE SIGNS

1 fluidization chamber
2 plenum chamber
3 gas distribution bottom plate
4 cooling chamber
5 product charging system/product inlet
6 product discharging system/product outlet
7 gas heater
8 filter system
9 recycled filtered gas stream
10 discharged gas stream
11 means for flushing the drying compartment with nitrogen or noble gases
12 heat exchanger
13 Elutriated fines separated from the vent stream
14 dry gas
15 device for homogeneous feed distribution
16 baffle plates
17 weir

EXAMPLES

1. Analytical Methods
Centrifuge Retention Capacity (CRC)

The gravimetric determination of fluid retention capacity in a saline solution after centrifugation was carried out according to the EDANA standard test WSP 241.3(10).
Adsorption Against Pressure/Adsorption under Pressure (AAP/AUP)

The gravimetric determination of adsorption under pressure at a pressure of 0.3 or 0.7 psi/21 to 49 mbar using polymeric particles having a particle size in the range of from 150 to 850 μm was determined according to the EDANA standard test WSP 242.3(10).
Adsorption under Load at 0.9 psi ($AUL_{0.9\ psi}$)

A nylon screen (50×50 mm$^2$; 100 mesh/149 μm) was placed on top of a perforated metal plate, followed by a filter paper and finally by a hollow stainless steel cylinder of 26 mm inner diameter, 37 mm outer diameter and a height of 50 mm. 167 mg of water-absorbing polymer particles were placed in the cylinder and evenly distributed. A non-woven sheet having a diameter of 26 mm covered the polymer and was pressed down with a plastic piston of a diameter of 26 mm, which carried a weight. The total mass of the piston and the weight on top the piston was 328.2 gram to provide a load of 0.9 psi (62.1 mbar). The cylinder was immersed into a 0.9% saline solution such that the nylon screen and the solution surface had the same level to allow absorption of the liquid by the filter paper and the water-absorbing polymer particles without any hydrostatic pressure. The particles were soaked for one hour. The plate was removed from the water reservoir and excess liquid in the holes of the metal plate and the nylon screen was soaked up by paper tissue. Then the weight was removed from the swollen gel and the gel was weighed. The weight of saline solution absorbed under load by one gram of water absorbent polymer particles is reported as the absorption under load ($AUL_{0.9psi}$).
Extractables (Extr.)

Determination of extractable polymer content by potentiometric titration was carried out using the EDANA Standard Test WSP 270.3(10).
Residual Acrylic Acid (Res. AA)

The amount of residual monomers in the superabsorbent materials, i.e. the amount of residual acrylic acid in the polyacrylate superabsorbent particles, was determined using the EDANA Standard Test WSP 210.3(10).
Permeability under Load (PUL)

The method used for determining the permeability under load is similar to the method for determining the AAP described above. For determining PUL, the above described AAP method was carried out, in which 0.9 g of the superabsorbent particles were placed in the AAP cell to obtain the $AAP_{0.7\ psi\ (0.9g)}$ value. This method is then repeated with a weight of 5 g±0.005 g from the same superabsorbent material to be tested in order to obtain the $AAP_{0.7\ psi\ (5g)}$ value. The PUL-value is defined by the ratio of $AAP_{0.7\ psi\ (0.9g)}/AAP_{0.7\ psi\ (5g)} \times 100$.
Saline Flow Conductivity (SFC)

The method described in U.S. Pat. No. 5,562,646 and U.S. Pat. No. 5,559,335 was used. For each test, an aliquot of 0.9 g of the superabsorbent polymeric particles having a particle size of from 150 to 850 μm was used.
Particle Size Distribution (PSD)

The particle size distribution up to a size of 850 μm of the super absorbent materials was determined using the EDANA Standard Test WSP 220.3(10).
Moisture Content (Moisture)

The residual moisture content of the superabsorbent materials, i.e. the evaluation of mass loss upon heating, was determined using the EDANA Standard Test WSP 230.3 (10).
Hunter Color (Color L, a, b)

The hunter color was determined according to ASTM methods E 1164-94 and E 1347-97. In this method, the color (reflectance) of a material is measured using a Hunter Color Difference Meter. The sample color is reported in terms of three values; L is a correlate of "lightness", a & b are termed color axes. Value a indicates redness or greenness if negative, and b indicates yellowness or blueness if negative.

2. Preparation of Superabsorbent Polymers
Preparation of Polymer 1

A monomer solution was prepared in batch-mode by mixing carefully 724.44 kg of sodium hydroxide, 3717.73 kg of process water (partially de-mineralized ground water) and 1401.3 kg of glacial acrylic acid (AA) (99.8%). To this solution were added 3.63 kg of a 40.2% active solution of the penta-sodium salt of diethylene triamine pentaacetic acid (commercially available under the trademark name Versenex™ 80 from the Dow Chemical Company), corresponding to an amount of 750 ppm, based on acrylic acid (b.o.AA), 10.32 kg of a 5% active solution of sodium chlorate (265 ppm b.o.AA), 11.68 kg PEG 600 (6000 ppm b.o.AA) and a mixture of 598 kg of glacial acrylic acid (99.8%) and 6.23 kg of ethoxylated trimethylolpropane triacrylate with an average of 15 EO-units per molecule (3200 ppm b.o.AA). During mixing, the temperature of the solution was controlled to be below 35° C.

The monomer solution was then transferred into a horizontal single screw kneader reactor. During transport to the reactor, 1.3 kg of a 30% active solution of hydrogen peroxide (200 ppm b.o.AA) and 42.82 kg of a 10% active solution of sodium persulfate (2200 ppm b.o.AA) were mixed with the monomer solution. 368.1 kg of superabsorbent fines (18.4% b.o.AA) were added and homogeneously mixed into the monomer solution. The resulting mixture was de-oxygenated by purging it with nitrogen. The temperature was then adjusted to 30° C. Polymerization was initiated by adding 36.1 kg of a 1% active solution of sodium erythorbate (185 ppm b.o.AA) to the reactor under agitation. Once polymerization had started the temperature of jacket and shaft of the reactor was adjusted to 70° C. Once the reaction mixture reached a temperature close to 85° C., the pressure in the reactor was decreased such, that the peak temperature was maintained at 85° C. After having reached said peak temperature the polymer gel was cooled down to 70° C. by further reducing the pressure in the reactor. The vapor was condensed in a condenser above the reactor and redirected onto the gel in the reactor. 10 min after having reached the peak temperature, the granulated polymer gel was transferred into a slowly agitated hold tank for an average residence time of 100 min from where it was continuously withdrawn to be further sized in an extruder, spread onto the belt of a belt drier and dried in a hot-air stream at 170° C. for 20 min. The polymer layer obtained was crushed, ground in a roll mill (Bauermeister) and sieved (0.15 to 1.18 mm) to obtain polymer 1.

Preparation of Polymer 2

The procedure described for the preparation of polymer 1 was repeated, except that 5.84 kg of HE-TMPTA (3000 ppm b.o.AA) were used.

Preparation of Polymer 3

The procedure described for the preparation of polymer 1 was repeated, except that 4.28 kg of ethoxylated trimethylolpropane triacrylate with an average of 15 EO-units per molecule (1900 ppm b.o.AA) were used.

The properties of polymers 1 to 3 are summarized in Table 1a.

TABLE 1a

Properties of polymers 1-3 prior to heat-treatment

| Polymer | CRC (g/g) | Moisture (%) | Particle size distribution (mm, % on screen) | | | | | |
|---|---|---|---|---|---|---|---|---|
| | | | 0.85 | 0.6 | 0.3 | 0.15 | 0.045 | <0.045 |
| 1 | 38.1 | 1.5 | 0.1 | 15.8 | 66.8 | 3.8 | 3.6 | 0 |
| 2 | 38.9 | 1.9 | 0.1 | 16.7 | 62.3 | 15.9 | 4.8 | 0.1 |
| 3 | 38.1 | 1.5 | 0.1 | 15.8 | 66.8 | 3.8 | 3.6 | 0 |

Preparation of Polymer 4

The procedure described for the preparation of polymer 3 was repeated, except that the monomer formulation contained no chlorate and only 1.06 kg of a 40.2% active solution of the penta-sodium salt of diethylene triamine pentaacetic acid (220 ppm b.o.AA). 2.28 kg of a 30% active solution of hydrogen peroxide (350 ppm b.o.AA), 27.25 kg of a 10% active solution of sodium persulfate (1400 ppm b.o.AA) and 42.82 kg of a 1% active solution of sodium erythorbate (220 ppm b.o.AA) were applied.

Preparation of Polymer 5

The procedure described for the preparation of polymer 4 was repeated, except that as a cross-linker 2.8 kg of ethoxylated trimethylolpropane triacrylate with an average of 15 EO-units per molecule (1443 ppm b.o.AA) was used and 5.42 kg of a 70% active solution of polyethylenglycol monoallyletheacrylacrylic acid ester (PEG-MAE-AE) with an average of 10 EO-units per molecule (1950 ppm b.o.AA) was added as an additional network cross-linker.

Preparation of Polymer 6

The procedure described for the preparation of polymer 4 was repeated, except that as a cross-linker 2.4 kg of ethoxylated trimethylolpropane triacrylate with an average of 15 EO-units per molecule (1235 ppm b.o.AA) was used and 5.64 kg of a 70% active solution of polyethylenglycoi monoallyletheacrylacrylic acid ester (PEG-MAE-AE) with an average 10 EO-units (2030 ppm b.o.AA) was added.

Preparation of Polymer 7

The procedure described for the preparation of polymer 4 was repeated, except that as a cross-linker 3.27 kg of ethoxylated trimethylolpropane triacrylate with an average of 15 EO-units per molecule (1685 ppm b.o.AA) was used and 6.47 kg of a 70% active solution of polyethylenglycol monoallyl ether-acrylacrylic acid ester (PEG-MAE-AE) with an average 10 EO-units (2330 ppm b.o.AA) was added.

Preparation of Polymer 8

The procedure described for the preparation of polymer 4 was repeated, except that as a crosslinker 4.7 kg of ethoxylated trimethylolpropane triacrylate with an average of 15 EO-units per molecule (2420 ppm b.o.AA) was used and 7.9 kg of a 70% active solution of polyethylenglycol monoallyl ether-acrylaciylic acid ester (PEG-MAE-AE) with an average 10 EO-units (2860 ppm b.o.AA) was added.

The properties of polymers 4-8 prior to heat-treatment are summarized in Table 1b.

TABLE 1b

Properties of polymers 4-8 prior to heat-treatment

| Polymer | CRC (g/g) | Extr.$_{16 h}$ (%) | Res. AA (ppm) | Moisture (%) | Hunter Color | |
|---|---|---|---|---|---|---|
| | | | | | L | b |
| 4 | 42.8 | 16.2 | 400 | 3.5 | 93.2 | 6.4 |
| 5 | 37.9 | 11.6 | 431 | 3.4 | 93.6 | 6.4 |
| 6 | 39.7 | 13.0 | 379 | 3.6 | 93.6 | 6.5 |
| 7 | 34.6 | 9.4 | 472 | 3.1 | 94.2 | 6.4 |
| 8 | 33.1 | 7.8 | 563 | 3.3 | 94.2 | 5.9 |

Preparation of Polymer 9

The procedure described for the preparation of polymer 4 was repeated, except the monomer formulation comprised 2.8 kg of ethoxylated trimethylolpropane triacrylate (HE-TMPTA) with an average of 15 EO-units per molecule (1443 ppm b.o.AA) and 5.42 kg of a 70% active solution of polyethylenglycol monoallyl ether acrylacrylic acid ester (PEG-MAE-AE) with an average of 10 EO-units (1950 ppm b.o.AA). Furthermore 11% b.o.AA of superabsorbent fines were added and homogeneously mixed in the monomer solution.

Preparation of Polymer 10

The procedure described for the preparation of polymer 9 was repeated, except that the monomer formulation comprised 2.4 kg of ethoxylated trimethylolpropane triacrylate (HE-TMPTA) with an average of 15 EO-units per molecule (1235 ppm b.o.AA) and 5.64 kg of a 70% active solution of polyethylenglycol monoallyl ether acrylacrylic acid ester (PEG-MAE-AE) with an average 10 EO-units (2030 ppm b.o.AA).

Preparation of Polymer 11

The procedure described for the preparation of polymer 9 was repeated, except that the monomer formulation comprised 3.27 kg of ethoxylated trimethylolpropane triacrylate (HE-TMPTA) with an average of 15 EO-units per molecule (1685 ppm b.o.AA) and 6.47 kg of a 70% active solution of polyethylene glycol monoallyl ether acrylacrylic acid ester (PEG-MAE-AE) with an average of 10 EO-units per molecule (2330 ppm b.o.AA).

Preparation of Polymer 12

The procedure described for the preparation of polymer 9 was repeated, except that the monomer formulation comprised 4.7 kg of ethoxylated trimethylolpropane triacrylate (HE-TMPTA) with an average of 15 EO-units per molecule (2420 ppm b.o.AA) and 7.9 kg of a 70% active solution of polyethylene glycol monoallyl ether acrylacrylic acid ester (PEG-MAE-AE) having on average 10 EO-units (2860 ppm b.o.AA).

Preparation of Polymer 13

The procedure described for the preparation of polymer 12 was repeated, except that the monomer formulation comprised 9.88 kg of a 70% active solution of polyethyleneglycol monoallyl ether acrylacrylic acid ester (PEG-MAE-AE) with an average of 10 EO-units per molecule (3580 ppm b.o.AA) and that PEG 600 was omitted.

The properties of polymers 4 and 9 to 13 are summarized in Table 1c.

TABLE 1c

Properties of polymers 4 and 9 to 13

| Polymer | CRC (g/g) | Extr.$_{16 h}$ (%) | Res. AA (ppm) | Moisture (%) | Hunter Color L | b |
|---|---|---|---|---|---|---|
| 4 | 42.8 | 16.2 | 400 | 3.5 | 93.2 | 6.4 |
| 9 | 37.9 | 11.6 | 431 | 3.4 | 93.6 | 6.4 |
| 10 | 39.7 | 13.0 | 379 | 3.6 | 93.6 | 6.5 |
| 11 | 34.6 | 9.4 | 472 | 3.1 | 94.2 | 6.4 |
| 12 | 33.1 | 7.8 | 563 | 3.3 | 94.2 | 5.9 |
| 13 | 33.1 | 7.1 | 586 | n.d.[1] | 91.9 | 5.8 |

Preparation of Polymer 14

The procedure described for the preparation of polymer 3 was repeated, except that the concentration of ethoxylated trimethylolpropane triacrylate (HE-TMPTA) was changed to 2200 ppm b.o.AA and that 200 ppm b.o.AA of glycerin was added to the monomer solution.

Preparation of Polymer 15

The procedure described for the preparation of the polymer 3 was repeated, except that the concentration of the ethoxylated trimethylolpropane triacrylate (HE-TMPTA) was changed to 2700 ppm b.o.AA and that 600 ppm b.o.AA of glycerin was added to the monomer solution.

The properties of polymers 14 and 15 are summarized in Table 1d.

TABLE 1d

Properties of polymers 14 and 15

| Polymer | CRC (g/g) | Extr.$_{16 h}$ (%) | Res. AA (ppm) | Moisture (%) |
|---|---|---|---|---|
| 14 | 50.8 | 18.2 | 255 | 1.3 |
| 15 | 37.8 | 16.4 | 282 | 1.4 |

Preparation of Polymer 16

A monomer solution was prepared by mixing carefully 2925.67 kg of a 25% active sodium hydroxide solution, 1495.13 kg of process water (partially de-mineralized ground water) and 1357.8 kg of glacial acrylic acid (AA) (99.9% active). To this solution were added 3.62 kg of a 40.2% active solution of Versenex™ 80, 1.71 kg of a 5% active solution of sodium chlorate (265 ppm b.o.AA), 22.61 kg of a 60% active solution of PEG 600 (7000 ppm b.o.AA) and a mixture of 581.9 kg of glacial acrylic acid (99.9% active) and 4.84 kg of ethoxylated trimethylolpropane triacrylate with an average of 15 EO-units per molecule (2500 ppm b.o.AA). In this monomer solution, 68.6% of the acrylic acid was neutralized. During mixing, the temperature of the solution was controlled to be below 35° C.

The monomer solution was then transferred into a horizontal single screw kneader reactor. During transfer 1.3 kg of a 30% active solution of hydrogen peroxide (200 ppm b.o.AA) and 42.82 kg of a 10% active solution of sodium persulfate (2200 ppm b.o.AA) were mixed with the monomer solution. 319.72 kg of superabsorbent fines (16.5% b.o.AA) were added and homogeneously mixed into the monomer solution. The mixture was de-oxygenated by purging it with nitrogen. The temperature was adjusted to 30° C. and finally the polymerization was initiated by adding 36.1 kg of a 1% active solution of sodium erythorbate under agitation.

After the start of polymerization the temperature of jacket and shaft of the reactor was adjusted to 70° C. Once the reaction mass reached a temperature close to 85° C., the pressure in the reactor was decreased to control the peak temperature at 85° C. After having reached said peak temperature, the polymer gel was cooled to 70° C. by further reducing the pressure in the reactor. The vapor was condensed in a condenser above the reactor and redirected onto the gel in the reactor. About 10 min after having reached the peak temperature the granulated polymer gel was transferred into a slowly agitated hold tank for an average residence time of about 100 min from where it was continuously withdrawn to be further sized in an extruder, spread onto the belt of a belt drier and dried in a hot air stream at about 170° C. for 20 min. The polymer layer obtained was crushed and ground in a roll mill (Bauermeister) and classified to obtain polymer 16 having a particle size between 100 and 800 μm.

Preparation of Polymer 17

The procedure described lbr the preparation of polymer 16 was repeated, except that the degree of neutralization was adjusted to be 65%, the concentration of PEG 600 was reduced to 5000 ppm and the concentration of recycled fines to 11% (all b.o.AA).

Preparation of Polymer 18

The procedure described for the preparation of polymer 16 was repeated, except that the following concentrations were changed: PEG 600 to 8000 ppm, HE-TMPTA to 2700 ppm, Versenex® 80 from to 500 ppm, hydrogen peroxide to 350 ppm and sodium persulfate to 1700 ppm. Furthermore, 200 ppm of glycerin (all concentrations b.o.AA), but no fines were added.

Preparation of Polymer 19

A monomer solution was continuously prepared consisting of 31.74 parts of acrylic acid (active content 99.9%), 43.85 parts of a 25% active aqueous solution of sodium hydroxide to neutralize the acrylic acid to a degree of 65%, and 15.63 parts of water, all based on 100 parts of final monomer solution. To this mixture were added 0.48 parts of a 5% active aqueous solution of Versenex™ 80 (750 ppm b.o.AA), 0.17 parts of a 5% active aqueous solution of sodium chlorate (265 ppm b.o.AA), 0.07 parts of HE-TMPTA (2200 ppm b.o.AA), 0.37 parts of a 60% active aqueous solution of PEG 600 (7000 ppm b.o.AA) and 0.00636 parts of glycerin (200 ppm b.o.AA). This monomer solution, having a temperature of about 28° C. and a total solids content of about 38%, was continuously transferred to a two screw reactor at a feed rate of 6500 kg/hour. Into said feed stream was continuously injected 0.26 parts of a 3% active aqueous hydrogen peroxide solution (250 ppm b.o.AA), 0.79 parts (2500 ppm active b.o.AA) of a 10% active aqueous sodium peroxide solution, 7% of superabsorbent fines and a stream of about 13.5 kg/h of nitrogen. To the feed zone of the reactor 0.84 parts of a 0.7% aqueous sodium erythorbate solution were added continuously (all parts based on 100 parts of final monomer solution). Furthermore 70 kg/h of steam were injected through a bottom valve in the reactor. Polymerization occurred in the reactor and the peak-temperature was controlled at 85° C. by reducing the pressure in the reactor to 850 mbar. Evaporated water was condensed in a condenser above the reactor and redirected onto the gel in zone 3 of the reactor. The free flowing, granulated gel was continuously discharged from the reactor into the hold tank where it resided for about one hour at a temperature of 83° C., was minced through a die plate having 6 mm wide slits which were radially arranged and dried on a belt drier in an air stream having a temperature of 170° C. for 20 min. After drying, the polymer was ground in a roll mill and sieved to obtain a particulate polymer having a particle size of between 150 and 800 mm.

The properties of polymers 16-19 are summarized in Table 1e.

TABLE 1e

Properties of polymers 16 to 19

| Polymer | CRC (g/g) | Res AA (ppm) | Extr. (%) |
|---|---|---|---|
| 16 | 33.9 | 174 | 13.8 |
| 17 | 37.2 | 194 | 17.7 |
| 18 | 49.6 | 527 | 21.9 |
| 19 | 43.5 | 281 | 21.7 |

Preparation of Polymers 20-22

A monomer solution was prepared by mixing carefully 1263.67 parts of 99.9% active acrylic acid and 1993.66 parts of 24% active NaOH (resulting in a degree of neutralization of 68%) under cooling, so that the temperature of the mixture was permanently kept below 35° C. To this mixture were added 236.91 parts of water, 18.94 g parts of sodium sulphate, 2.9 parts of HE-TMPTA (2300 ppm b.o.AA), 12.62 parts of a 60% active solution of PEG 600 (6000 ppm b.o.AA) and glycerin (for polymer 20 250 mg/200 ppm b.o.AA, for polymer 21 500 ppm and for polymer 22 1000 ppm). Then 126.2 parts of SAP-fines (10% b.o.AA) and 0.25 parts of Versenex™ 80 (10 ppm b.o.AA) were added.

The mixtures were kept at 22° C., while the initiator solutions were prepared and de-oxygenated. These initiator solutions were then fed to the monomer feed through T-fittings. The atmosphere of the head space of the polymerization reactor was kept inert by continuously purging it with a nitrogen stream of 200 L/h. The temperature of reactor jacket was set to 90° C. The monomer solution was continuously fed into this reactor at a temperature of 22° C. with a rate of 6.5 kg/h (2.1 kg/L of total reactor volume) which was de-oxygenated in the bubble column using a nitrogen stream of 20 L/h, a 35% active aqueous solution of hydrogen peroxide (350 ppm active b.o.AA), a 10% active aqueous solution of sodium persulfate (1700 ppm active b.o.AA), 20% of scrubber water (b.o.AA) containing 10% of sodium carbonate and 2% of NaOH and an 0.7% active aqueous solution of sodium erythorbate (200 ppm b.o.AA). The carbonate of the scrubber water completed deoxygenation and sodium ascorbate finally triggered immediate initiation of the polymerization reaction.

At steady state conditions, the monomer feed was at least partially mixed with the polymer gel present in the reactor (on average about 1.7 kg) and polymer gel was continuously discharged through the opening and the discharge tube of the end plate into the gel receptacle. The discharged gel was kept under nitrogen for additional 60 min before being processed further. The granulated gel as discharged from the reactor still having a temperature above 60° C. was extruded through a kitchen type meat-mincer equipped with a die plate having openings of 8 mm. A portion of 800 g of the extruded gel was then placed in a basket made of a metal screen having a mesh size of 2 mm. Said basket was placed in a lab-size gel drier and was dried in a hot air stream of 5 m/s at a temperature of 180° C. for 20 min. The dry polymer obtained was ground in a roll mill and sieved in a Retsch sieve tower equipped with sieves having mesh sizes of 850 and 150 µm. Properties of polymers 20 to 22 are summarized in Table 1f.

TABLE 1f

Properties of polymers 20-22

| Polymer | Glycerin (ppm) | CRC (g/g) | $AAP_{0.3\,psi}$ (g/g) | Extr. (%) | Res AA (ppm) |
|---|---|---|---|---|---|
| 20 | 200 | 39.5 | 7.7 | 19.8 | 400 |
| 21 | 500 | 38.1 | 7.6 | 19.8 | 642 |
| 22 | 1000 | 38.6 | 7.6 | 20.9 | 308 |

3. Heat-treatment in a Continuously Operated Fluidized Bed Dryer

Comparative Example 1

Heat-treatment of Polymer 2 in a Continuous FBD Using Standard Conditions

Polymer 2 was produced during regular production for 10 month and heat-treated in a fluidized bed dryer with an essentially horizontal longitudinal axis equipped with a fine-hole plate (Conidur plate, Type 101, Hein & Lehmann, Germany) with a plate area of 8 m² and holes of 0.35 mm, providing a pressure loss of 270 Pa with hot air having a temperature of 260° C., said plate being divided in two zones, two heat-exchanger for air heating (one for each zone) and a cooling chamber. The weir to the cooling chamber was set to provide a fluidized bed height of 40 cm. The fluidized bed dryer was operated with air as the fluidizing gas. The product temperature in the first zone was set to 220° C. and in the second zone to 230° C. To reach these temperatures, air was fed to the plenum of zone one with a feed rate of 5650 kg/h (feed stream), providing an superficial air velocity of 0.59 m/s and having a temperature of 260° C. and to the plenum of zone two with a feed rate of 3350 kg/h (feed stream) and a temperature of 235° C. Air of ambient temperature was introduced into the cooling chamber at a rate of 1450 kg/h and the same amount was discharged to the environment. Polymer 2 was fed into the fluidized bed dryer with a feed rate of 1754 kg/h. After an average residence time in the heating chambers of 40 min, the product was cooled down in the cooling chamber to a temperature of about 50° C.

During a 10 month production period 24 cases of product decomposition occurred, all in zone one of the fluidized bed dryer which caused plant shut-downs to terminate decomposition, to clean the system and to separate material contaminated with brown and black particles of decomposed material. Due to these undesired shut-downs, a loss in production capacity of 5% and product loss of 2.9% based on total production incurred.

Example 1

Heat-treatment of Polymer 2 in a Continuous FBD According to the Present Invention Heat-treatment in the FBD described in comparative example 1 was continued with polymer 2 for further 7 month after the design of the fluidized bed dryer was optimized by exchanging the bottom plate to a more suitable type, e.g. the above mentioned CONIDUR® fine-hole sheets types: 1 to 8, having a hole size of 0.3 mm and providing a pressure loss of 530 Pa with hot air having a temperature of 260° C. Other conditions were kept constant, except that air was fed to the plenum of zones one with a feed rate of 5260 kg/h, providing an superficial air velocity of 0.35 m/s and having a temperature of 260° C. and to the plenum of zone two with a feed rate of 2240 kg/h, a temperature of 235° C. and a heat-up rate of approximately 30° C./min. During continuous production campaign of 7 month, no decomposition was observed, so that neither production capacity nor product was lost.

Example 2

Heat-treatment of Polymer 1 in a Continuous FBD According to the Present Invention Polymer 1 was heat-treated in a fluidized bed dryer under the conditions described in example 1, except the polymer was fed to the fluidized bed dryer at a feed rate of 1050 kg/h and that the product temperature in the first zone was set to 205° C. with a heat-up rate of 25° C./min and in the second zone to 215° C. To reach said product temperatures, air was fed to the plenum of zone one with a feed rate of 5469 kg/h and a temperature of 246° C. and to the plenum of zone two with a feed rate of 3017 kg/h and a temperature of 235° C. After an average residence time in the heating chamber of 40 min, the product was cooled down in the cooling chamber to a temperature of about 50° C. A representative sample was taken at the outlet of the fluidized bed dryer.

Example 3

Heat-treatment of Polymer 2 in a Continuous FBD According to the Present Invention The procedure of example 1 was repeated except that polymer 2 was fed to the fluidized bed dryer at a feed rate of 1050 kg/h and that the product temperature in the first zone was adjusted to 230° C. with a heat-up rate of 35° C./min and in the second zone to 228° C. To obtain these temperatures the air to zone one was heated up to 287° C. and to zone two to 232° C. The product had also an average residence time in the heating chambers of 40 min. The product properties of the products obtained are summarized in Table 2 and 3.

TABLE 2

Properties of polymers 1 and 2 after heat-treatment

| Example | CRC (g/g) | $AAP_{0.7\,psi}$ (g/g) | Extr. (%) | Res AA (ppm) |
|---|---|---|---|---|
| 2 | 31.8 | 22.0 | 7.0 | 397 |
| 3 | 33.3 | 24.4 | 8.9 | 255 |

TABLE 3

Particle size distribution of polymers 1 and 2 after heat-treatment

| Example/ Polymer | Particle size distribution (mm, % on screen) | | | | | |
|---|---|---|---|---|---|---|
| | 0.85 | 0.6 | 0.3 | 0.15 | 0.045 | <0.045 |
| 2/1 | 0 | 17.0 | 74.4 | 10.4 | 0.1 | 0 |
| 3/2 | 0 | 17.7 | 73.4 | 9.4 | 0.1 | 0 |

The experiments surprisingly demonstrate that by using the method of the present invention, products having desirable absorption capacities, favorable ratios CRC to AAP and CRC to extractables, respectively, as well as low residual monomer contents can be obtained. In particular Example 3 further demonstrates the benefit of using a temperature for the hot gas stream well above 200° C., thus raising the heat-up rate. Higher CRC and AAP values were achieved although the cross-linker concentration was slightly reduced in comparison to Example 2.

4. Variation of Heat-up Rate

Example 4 and 5 were performed in a batch-operated fluidized bed drier on a laboratory scale, type CTL (Allgaier-Werke KG, Uhingen, Germany), equipped with a conically shaped fluidization chamber with a Conidur® fine-hole plate having a diameter of 20 cm on the bottom side, a ventilator, an air heater, a fresh air and an exhaust air filter which, if desired, can be de-dusted by pressured air blasts and a control box. The air stream is not circulated in this drier.

The batch-operated fluidized bed dryer was pre-heated with a hot air stream of 5 m/s having a temperature indicated below (inlet air temperature). After the product zone of the heater had reached the desired temperature, the sample of polymeric particles to be heat-treated was filled in, thus being heated up and fluidized by said hot air stream. Once the product sample has reached the targeted temperature $T_p$ (e.g. 230° C.), fluidization and heat-treatment was continued for the desired heat-treatment time, e.g. for additional 40 min. During the heat-treatment time the inlet air temperature was adjusted such that the product was maintained at the desired heat-treatment temperature ±2° C. After elapse of the heat-treatment time, the heat-treated product was discharged to a metal tray and cooled down to room temperature. The heat-treatment time given in the following examples is defined by the range of time from the point where the product has reached the targeted temperature until the point where fluidization is stopped and particles are discharged for cooling.

Examples 4a-4c

Varying the Heat-up Rate by the Amount of Polymer to be Treated

Different amounts of polymer 2 (a: 100 g, b: 500 g and c: 1,000 g) were heat-treated for 40 min according to the heat-treatment procedure described under item 4.1. The temperatures in the product zone of the fluidized bed dryer were recorded and are shown in FIG. 4. The results of the Examples 4a-4c are gathered in Table 4.

The results unambiguously show the positive impact of a fast heat-up rate on the absorption capacity. As illustrated in FIG. 4, the heat-up rate can efficiently be influenced by varying quantity of particles and bed height in the fluidization chamber, respectively.

TABLE 4

Results obtained in examples 4a-c

| Example | Polymer Amount | CRC [g/g] | $AUL_{0.9\,psi}$ (0.7 psi) [g/g] | Res AA [ppm] | Extr [%] |
|---|---|---|---|---|---|
| 4a | 100 g | 35.4 | 20.7 (23.7) | 221 | 13.7 |
| 4b | 500 g | 33.0 | 20.2 (23.2) | 214 | 13.0 |
| 4c | 1000 g | 30.3 | 20.3 (23.4) | 268 | 9.5 |

Examples 5a-5c

Varying the Heat-up Rate by Inlet Temperature

Samples of polymer 2 (500 g each) were heat-treated for 25 min according to the heat-treatment procedure described in example 4, except that the inlet-air temperature was varied as indicated in Table 5.

TABLE 5

Results of the Examples 5a-c

| Example | $T_{g1}$ | CRC [g/g] | $AUL_{0.7\,psi}$ [g/g] | Time (min) to reach $T_p = 220°$ C. |
|---|---|---|---|---|
| 5a | 245° C. | 29.7 | 24.1 | 10 |
| 5b | 260° C. | 32.9 | 24.3 | 5.2 |
| 5c | 280° C. | 35.2 | 24.6 | 3.4 |

The results again confirm the impact of the heat-up rate on the absorption performance of the product. As demonstrated by these experiments, the inlet-air temperature is another tool to control this rate.

5. Surface-cross-linking of Dried Polymeric Particles
5.1 Surface Coating with an Aqueous Ethylene Carbonate (EC) Solution A portion of 1 kg of dried and ground SAP was filled into a plowshare mixer (Lödige) having a total volume of 6.1 L Under vigorous agitation 31.6 g of an 30% aqueous solution of ethylene carbonate (9500 ppm b. o. dry SAP) were sprayed onto the agitated product with the aid of a time-spraying nozzle at room temperature. No further additives or post-cross-linkers were added. When addition was completed, the rotation speed of the agitator then was reduced and the wetted product was held under moderate agitation for further 15 min.

5.2 Heat-treatment in a Small Laboratory Fluidized Bed Dryer

The samples were heat-treated in a small laboratory fluidized bed dryer, in which a hot air stream was provided by a hot-air gun (Bosch, Gerlingen, Germany). The fluidization chamber was conically designed, having a lower diameter of 35 mm, an upper diameter of 60 mm and a 100 metal screen as a bottom plate. The chamber was covered by a lid containing an opening, which was covered by a 100 μm metal screen. Two thermo couples were fixed for temperature measurement, one entering the hot air duct 1 cm below the bottom plate to measure the hot-air inlet temperature and the second entering the fluidization chamber 3 cm above the bottom plate to measure the temperature of the fluidized product. Both inlet temperature and product temperature could be controlled in the range of about ±1° C.

For heat-treatment, the fluidized bed dryer was pre-heated to the desired temperature (e.g. 230° C.) by providing a hot-air stream. Once the temperature in the fluidization chamber had reached said temperature, a product sample of 30 g (unless stated otherwise) was filled into said chamber, the sample being fluidized by the hot-air stream of the appropriate air inlet temperature. During a first period of time the particles were heated up with a rate of 45° C./min to the desired heat-treatment temperature (heat-up phase). Once the particles had reached the desired heat-treatment temperature $T_p$, the actual heat-treatment time began and the inlet air temperature was adjusted accordingly to hold the desired particle temperature $T_p$. The heat-treatment conditions at the desired temperature were maintained for 20 min unless indicated otherwise. At the end of the heat-treatment time the hot-air gun was switched off, the product was discharged and spread onto a plate for immediate cooling,
5.3 Heat-treatment of the Samples in an Erlenmeyer Flask Heated in an Oil Bath (Oil Bath Method)

Heat-treatment was performed in a 300 mL Erlenmeyer flask containing a magnetic stirring bar (60 mm×10 mm), the flask being heated in an oil bath, The whole heat-treatment system comprised two identical arrangements consisting each of an oil bath on a magnetic stirrer to heat and mix the polymer sample in the respective flask. Temperature control systems were used to set and control the oil bath and the product temperature as desired (±2° C.). Usually, the temperature in the two oil baths is different. The first one is used for heating-up the polymer sample and the second one for holding the sample at the desired temperature $T_p$ during heat-treatment.

A portion of 50 g of coated superabsorbent polymer was filled into the flask which was then placed into the pre-heated first oil bath. While gently being agitated, the polymer was heated up to the indicated temperature and then was immediately transferred from oil bath one into preheated oil bath two, where heat-treatment was performed at the indicated temperature $T_p$ for the indicated time. Thereafter, the product was removed from the flask and spread onto a plate for cooling, Example 6

Samples of polymer 3 were coated as described under item 5.1 and heat-treated at a particle temperature $T_p$ of 180°

C. applying the method described under item 5.2. The sample amounts used and heat-treatment times applied are given in Table 6.

TABLE 6

Conditions and results in examples 6a and 6b

| Example | Polymer amount (g) | Heat-treating time (min) | CRC (g/g) | $AAP_{0.7\,psi}$ (g/g) | $Extr._{16\,h}$ (%) |
|---|---|---|---|---|---|
| 6a | 20 | 20 | 34.1 | 23.2 | 15.3 |
| 6b | 50 | 40 | 33.4 | 23.3 | 17.5 |

The results demonstrate that polymers containing chlorate can successfully be used to produce a SAP with excellent product properties by surface post-cross-linking Larger samples require longer heat-up and heat-treatment times, The ratio $CRC/AAP_{0.7psi}$ is, therefore, slightly inferior

Examples 7-11

Samples (50 g each) of polymers 4-8 were coated as described under item 5.1 above and heat-treated applying the method described under item 5.2. Details are summarized in Table 7.

CE 7-11

Examples 7-11 were repeated except that heat-treatment was performed applying the method described under item 5.3. Conditions and results are summarized in Table 8. Herein, the abbreviations Ex and CE refer to examples and comparative examples, respectively. In addition, the mean parameters of the polymers obtained in examples 6 to 11 (referred to as ØEx 6-11 in Tab. 7) are shown in comparison to those of the respective comparative examples (referred to as Ø CE 6-11 in Tab. 7).

TABLE 7

Conditions and results in examples and comparative examples 6-11

| Example/ (Polymer) | $T_g$ (° C.) | $T_p$ (° C.) | CRC (g/g) | $AAP_{0.7\,psi}$ (g/g) | PUL (%) | $Extr._{16\,h}$ (%) | SFC ($cm^3 \cdot s/g \times 10^{-7}$) |
|---|---|---|---|---|---|---|---|
| Ex 7/(4) | 193 | 180 | 36.6 | 25.6 | 46.1 | 15.5 | 2 |
| CE 7/(4) | 197 | 180 | 39.1 | 21.5 | 27.2 | 13.3 | 0 |
| Ex 8/(5) | 193 | 180 | 33.1 | 26.3 | 69.2 | 11.6 | 11 |
| CE 8/(5) | 197 | 180 | 35.7 | 21.5 | 27.5 | 9.2 | 1 |
| Ex 9/(6) | 193 | 180 | 34.7 | 26.4 | 57.9 | 14.1 | 8 |
| CE 9/(6) | 197 | 180 | 36.5 | 23.0 | 31.0 | 10.6 | 2 |
| Ex 10/(7) | 193 | 180 | 31.3 | 26.8 | 72.9 | 9.1 | 12 |
| CE 10/(7) | 197 | 180 | 33.3 | 23.1 | 28.5 | 6.7 | 2 |
| Ex 11/(8) | 193 | 180 | 30.8 | 26.9 | 75.3 | 8.1 | 17 |
| CE 11/(8) | 197 | 180 | 31.1 | 26.6 | 42.6 | 5.9 | 4 |
| Ø Ex 6-11 | | | 33.3 | 26.4 | 64.3 | 11.7 | 9.9 |
| Ø CE 6-11 | | | 35.1 | 23.1 | 31.4 | 9.2 | 1.8 |

These results clearly demonstrate the benefit of heat-treatment in a fluidized bed dryer. Significantly improved $AAP_{0.7\,psi}$, PUL and SEC values (even without the addition of multivalent metal salts) were obtained in the fluidized bed dryer.

Examples 12-19

The coating procedure described for examples 6-11 was applied except that ethylene glycol (EG) or glycerin (Gly) was used as a surface cross-linker in concentrations as shown in Table 8. Polymer 5 was used in these examples.

CE 12 and 16

The procedure of examples 12 and 16, respectively, was repeated except that heat-treatment was performed applying the method described under item 5.3. Temperature conditions and results of the experiments are summarized in Table 8.

TABLE 8

Conditions and results in examples 12-19 and comparative examples 12 and 16

| x/CE | Cross-linker (ppm) | $T_{g1}$ (°C.) | $T_p$ (°C.) | CRC (g/g) | $AAP_{0.7\,psi}$ (g/g) | PUL (%) | SFC (cm³ · s/g × $10^{-7}$) |
|---|---|---|---|---|---|---|---|
| Ex 12 | 6000 EG | 197 | 180 | 33.5 | 23.5 | 68 | 9 |
| CE 12 | 6000 EG | 197 | 180 | 34.5 | 22.5 | 38 | 3 |
| Ex 13 | 6000 EG | 217 | 180 | 32.6 | 22.3 | 72 | 9 |
| Ex 14 | 6000 EG | 217 | 200 | 28.4 | 19.7 | 89 | 21 |
| Ex 15 | 6000 EG | 241 | 200 | 28.5 | 19.5 | 89 | 13 |
| Ex 16 | 10000 Gly | 197 | 180 | 32.9 | 20.7 | 67 | 7 |
| CE 16 | 10000 Gly | 197 | 180 | 33.1 | 21.8 | 35 | 0 |
| Ex 17 | 10000 Gly | 217 | 180 | 32.3 | 20.0 | 70 | 6 |
| Ex 18 | 10000 Gly | 217 | 200 | 28.9 | 19.4 | 84 | 11 |
| Ex 19 | 10000 Gly | 241 | 200 | 30.0 | 19.8 | 86 | 16 |

These data show that by heat-treatment in a fluidized bed products of good quality can be obtained, also in the presence surface (post) cross-linkers. It can particularly be seen that using a fluidized bed dryer excellent PUL and SFC values can be obtained without compromising CRC, AAP or the ratio CRC/AAP.

Examples 20-22

Samples of polymer 7 were coated and heat-treated as described above for examples 7-11, except that the coating solution further contained aluminum lactate in a concentration of 2,500 ppm, based on dry weight of the polymer. Temperatures and results of the experiments are summarized in Table 9.

Comparative Example 20

The procedure of the example 20 was repeated except that heat-treatment was performed applying the method as described under item 5.3. Temperatures and results of the experiments are summarized in Table 9.

TABLE 9

Conditions and results of examples 20-22 and comparative example 20

| Ex/CE | Aluminum lactate (ppm) | $T_{g1}$ (°C.) | $T_p$ (°C.) | CRC (g/g) | $AAP_{0.7\,psi}$ (g/g) | PUL (%) | SFC (cm³ · s/g × $10^{-7}$) |
|---|---|---|---|---|---|---|---|
| Ex 20 | 2500 | 197 | 180 | 29.1 | 26.7 | 79 | 19 |
| CE 20 | 2500 | 197 | 180 | 29.8 | 26.3 | 65 | 7 |
| Ex 21 | 2500 | 217 | 180 | 28.5 | 26.4 | 83 | 24 |
| Ex 22 | 2500 | 217 | 190 | 27.2 | 24.4 | 91 | 51 |

The results again demonstrate the advantage of using a fluidized bed dryer for heat-treatment. In particular, the PUL and SFC values are increased, indicating an improved permeability of the polymer. These data also demonstrate that a higher heat-up rate (given by the higher inlet temperature $T_{g1}$) results in significantly improved product permeability.

In general, the above experimental results also show that using a fluidized bed dryer for heat-treatment, surface-modifying additives such as aluminum salts or silica are not mandatory. This is an important point with respect to costs and process complexity. In addition, no additives are needed to reduce shear force during heat-treatment as it is the case for heat-treatment in a paddle dryer. A further important advantage of not using those additives is that they do not contaminate the streams to be recycled.

6. Surface-wetting of Previously Dried Polymeric Particles

Examples 23-34

A portion of 1.0 kg of dried and ground polymeric particles was filled into a Plowshare mixer (Lödige) having a total volume of 6.1 L at room temperature. Under vigorous agitation 30 g of water were sprayed onto the agitated product with the aid of a spraying nozzle. No further additives and no post-crosslinkers were added to the product. Rotation speed of the agitator was then reduced and the moistened product was held under moderate agitation for further 15 min.

The samples were then heat-treated in a small laboratory scale fluidized bed dryer as described under item 5.2, except that product samples of 20 g were used and each sample was heat-treated for 20 min. The conditions employed are given in Table 10. No polymer wetting was performed for the comparative examples 23 to 29, 33 and 34.

TABLE 10

Conditions employed in examples and comparative examples 23-34

| Ex/CE | Polymer applied | Water for Wetting (%) | $T_{g1}$ (°C.) | $T_p$ (°C.) |
|---|---|---|---|---|
| Ex 23 | 3 | 3 | 240 | 220 |
| CE 23 | 3 | 0 | 240 | 220 |
| Ex 24 | 3 | 3 | 252 | 230 |
| CE 24 | 3 | 0 | 252 | 230 |
| Ex 25 | 4 | 3 | 252 | 230 |
| CE 25 | 4 | 0 | 252 | 230 |
| Ex 26 | 9 | 3 | 252 | 230 |
| CE 26 | 9 | 0 | 252 | 230 |

TABLE 10-continued

Conditions employed in examples and comparative examples 23-34

| Ex/CE | Polymer applied | Water for Wetting (%) | $T_{g1}$ (°C.) | $T_p$ (°C.) |
|---|---|---|---|---|
| Ex 27 | 10 | 3 | 252 | 230 |
| CE 27 | 10 | 0 | 252 | 230 |
| Ex 28 | 11 | 3 | 252 | 230 |
| CE 28 | 11 | 0 | 252 | 230 |
| Ex 29 | 12 | 3 | 252 | 230 |
| CE 29 | 12 | 0 | 252 | 230 |
| Ex 30 | 9 | 3 | 277 | 230 |
| CE 30 | 9 | 3 | 193 | 180 |
| Ex 31 | 9 | 3 | 241 | 220 |
| Ex 32 | 13 | 3 | 252 | 230 |
| Ex 33 | 14 | 3 | 245 | 230 |
| CE 33 | 14 | 0 | 245 | 230 |
| Ex 34 | 15 | 3 | 245 | 230 |
| CE 34 | 15 | 0 | 245 | 230 |

The product samples as obtained from the various experiments were analyzed and the results are given in Tables 11a-11c.

TABLE 11a

Results of examples and comparative examples 23 and 24

| Ex/CE | CRC (g/g) | $AAP_{0.7\,psi}$ (g/g) | $Extr._{16\,h}$ (%) | SFC ($cm^3 \cdot s/g \times 10^{-7}$) |
|---|---|---|---|---|
| Ex 23 | 36.0 | 26.4 | 12.3 | 7.0 |
| CE 23 | 36.4 | 19.6 | 9.8 | 3.5 |
| Ex 24 | 35.3 | 25.7 | 18.5 | 8.0 |
| CE 24 | 37.1 | 20.7 | 15.4 | 2.5 |

These results demonstrate the surprising positive effect of pre-wetting the polymeric particles prior to heat-treatment to improve AAP and SFC during heat-treatment.

TABLE 11B

Results of examples and comparative examples 25-32

| Ex/CE | CRC (g/g) | $AAP_{0.7\,psi}$ (g/g) | PUL (%) | $Extr._{16\,h}$ (%) | Hunter Color L | Hunter Color b | SFC ($cm^3 \cdot s/g \times 10^{-7}$) |
|---|---|---|---|---|---|---|---|
| Ex 25 | 35.9 | 21.9 | 39.3 | 6.7 | 90.1 | 11.1 | 2 |
| CE 25 | 37.6 | 16.7 | 23.4 | 7.4 | 91.1 | 9.8 | 1 |
| Ex 26 | 32.1 | 24.4 | 48.2 | 6.0 | 91.5 | 10.1 | 5 |
| CE 26 | 30.3 | 21.6 | 26.7 | 5.7 | 92.4 | 10.3 | 3 |
| Ex 27 | 32.7 | 23.3 | 47.7 | 5.7 | 91.3 | 10.1 | 5 |
| CE 27 | 31.6 | 19.9 | 25.6 | 5.9 | 92.7 | 9.4 | 1 |
| Ex 28 | 29.7 | 24.2 | 65.1 | 5.3 | 91.5 | 9.7 | 11 |
| CE 28 | 27.6 | 22.4 | 38.9 | 5.3 | 92.9 | 9.3 | 1 |
| Ex 29 | 28.8 | 24.2 | 58.0 | 4.9 | 91.0 | 9.4 | 7 |
| CE 29 | 27.9 | 23.4 | 43.4 | 4.6 | 92.0 | 9.5 | 7 |
| Ex 30 | 31.5 | 25.0 | 62.6 | 4.9 | 91.7 | 10 | 9 |
| CE 30 | 40.2 | 8.3 | 28.5 | 11.3 | 93.1 | 7.6 | 0 |
| Ex 31 | 33.4 | 24.7 | 42.1 | 5.6 | 92.2 | 9.0 | 3 |
| Ex 32 | 31.1 | 23.7 | 32.3 | 4.9 | 89.7 | 9.6 | 5 |
| Ø Ex 23-32 | 32.6 | 20.6 | 31.6 | | | | 2.8 |
| Ø CE 23-29 | 32.7 | 24.4 | 52.6 | | | | 5.6 |

The results show again the benefit of the present invention. Comparing the average of the comparative examples 23-29 with the average of the examples 23 to 32 it can be seen that by wetting the particles surface prior to heat-treatment in the fluidized bed dryer, the AAP after heat-treatment raises by almost 4 g/g, the PUL by 21 points and the SFC-value even doubles (in the absence of any permeability-promoting surface additives!), while the CRC stays substantially constant.

Comparative examples 30 demonstrates that a heat-treatment temperature of 180° C. in many cases does not give a product of the desired performance, but that higher temperatures, often close to product decomposition temperature often are required.

The beneficial effect of applying a high heat-up rate can be seen by comparing the results of example 26 and 30. The higher air inlet temperature applied in example 26 provides a higher heat-up rate leading to increased AAP, PUL and SFC values. In addition, the extractables level even dropped.

TABLE 11c

Results of examples and comparative examples 33-34

| Ex/CE | CRC (g/g) | $AAP_{0.7\,psi}$ (g/g) | PUL (%) | $Extr._{16\,h}$ (%) | SFC ($cm^3 \cdot s/g \times 10^{-7}$) |
|---|---|---|---|---|---|
| Ex 33 | 34.9 | 26.6 | 47 | 10.1 | 6 |
| CE 33 | 33.7 | 22.4 | 50 | 8.0 | 5 |
| Ex 34 | 29.1 | 26.0 | 88 | 10.8 | 27 |
| CE 34 | 30.5 | 24.2 | 39 | 8.7 | 5 |

Like the polymers used in examples 23 and 24 the polymers employed in examples 33 and 34 contain chlorate. In comparison to the results of examples 23 and 24, these examples demonstrate that the addition of even small amounts of glycerin positively influences the extractables concentration and the SFC value of the heat-treated polymeric particles.

7. Network Cross-linking Using Small Amounts of Glycerin

Example 35

100 g of polymer 18 were heat-treated at 230° C. for 15 min using the method described under item 4.

Comparative Example 35

500 g of polymer 16 were heat-treated at 230° C. for 40 min using the method described under item 4.

Example 36

500 g of polymer 18 were heat-treated at 230° C. for 15 min using the method described under item 4.

Comparative Example 36

Comparative example 35 was repeated, except that a hot air stream having a gas velocity of 8 m/s was applied.

Example 37

Example 35 was repeated, except that a hot air stream having a gas velocity of 8 m/s was applied.

Comparative Example 37

500 g of polymer 17 were heat-treated at 230° C. for 20 min using the method described under item 4.

Example 38

Example 38 was repeated, except that 500 g of the polymer were applied.

Comparative example 38

Comparative example 35 was repeated, except that a hot air stream having a gas velocity of 8 m/s was applied.

The results of examples and comparative examples 35 to 38 are presented in Table 12.

TABLE 12

Results of examples and comparative examples 35-38

| Ex/CE | CRC [g/g] | AUL$_{0.9\,psi}$ [g/g] | Res AA [ppm] | Extr. [%] |
|---|---|---|---|---|
| Ex 35 | 38.9 | 23.8 | 459 | 17.7 |
| CE 35 | 33.2 | 19.1 | 211 | 14.3 |
| Ex 36 | 32.3 | 23.1 | 558 | 12.9 |
| CE 36 | 33.1 | 20.2 | 214 | 13.0 |
| Ex 37 | 37.2 | 24.1 | 562 | 11.8 |
| CE 37 | 33.2 | 19.7 | 271 | 13.8 |
| Ex 38 | 34.6 | 22.2 | 704 | 7.2 |
| CE 38 | 36.0 | 20.4 | 267 | 12.7 |

Example 39

Polymer 19 was continuously fed into a fluidized bed dryer at a rate of 2400 kg/h and heat treated according to the method described in example 1 at a temperature of 230° C. and a weir height of 100 mm, which leads to a residence time of about 10 to 15 min at 230° C. The polymeric particles obtained had the following characteristics: CRC 28.3 g/g, AUL$_{0.9psi}$ 23.3 g/g, Res AA 282 ppm, Extr. 6.5%.

This example demonstrates that even in a continuously operated heat-treating process according to the present invention water-absorbing polymeric particles having a high AUL$_{0.9psi}$ can be obtained using small amounts of glycerin as a network cross-linker at heat-treatment temperatures above 200° C. and a fast heat-up rate. The heat-treated product furthermore comprises a very low amount of extractables and residual monomer.

Examples 40-46

Amounts of 20 g of the chlorate-free, glycerin-containing polymers 20 to 22 were heat-treated as described under item 4 applying an inlet gas temperature $T_{g1}$ of 255° C. and a particle temperature $T_p$ of 230° C. for the heat-treatment time t indicated in Table 13.

TABLE 13

Results obtained in examples 40-46

| Ex (Polymer) | Gly (ppm) | t (min) | CRC (g/g) | AAP$_{0.7\,psi}$ (g/g) | Extr. (%) | AAP$_{0.7\,psi}$/CRC | Res. AA (%) | PUL (%) | SFC (cm³·s/g × 10⁻⁷) |
|---|---|---|---|---|---|---|---|---|---|
| 40 (20) | 200 | 15 | 26.0 | 20.3 | 7.9 | 1.28 | 599 | 41 | 6 |
| 41 (20) | 200 | 20 | 25.8 | 20.2 | 7.3 | 1.28 | 538 | 51 | 9 |
| 42 (21) | 500 | 2.5 | 26.1 | 20.3 | 8.3 | 1.29 | 766 | 41 | 10 |
| 43 (21) | 500 | 5 | 25.1 | 20.7 | 7.3 | 1.21 | 805 | 51 | 15 |
| 44 (22) | 1000 | 2.5 | 22.5 | 20.3 | 6.2 | 1.11 | 468 | 79 | 17 |
| 45 (22) | 1000 | 5 | 21.2 | 19.8 | 5.9 | 1.07 | 505 | 85 | 41 |
| 46 (22) | 1000 | 20 | 18.6 | 18.2 | 4.8 | 1.02 | 467 | 96 | 62 |
| Ø 40-46 | | | 23.6 | 20.0 | 6.8 | 1.2 | 592.6 | 63.3 | 62 |

Comparing these results to that of the chlorate-containing polymers 16 to 18 in examples 35 to 38 (Table 12), one can see that in examples 40 to 46 lower CRC values, but nevertheless good AAP$_{0.7\,psi}$ values are obtained. In addition, good to excellent PUL and SFC values can be obtained as well as a low amount of extractables in the heat-treated glycerin-containing polymers without adding surface-modifying agent such as for example multivalent metal ions.

Furthermore, only very short residence times are required using polymers containing glycerin as a network cross-linker.

Examples 47-52

Examples 40 to 46 were repeated, except that the polymeric particles were wetted on their surface using an amount of 3 wt-% water immediately prior to being subjected to heat-treatment according to the method described under item 6.

The results are presented in Table 14.

TABLE 14

Results obtained in examples 47-52

| Ex (Polymer) | Gly (ppm) | t (min) | CRC (g/g) | $AAP_{0.7\,psi}$ (g/g) | Extr. (%) | $AAP_{0.7\,psi}$/CRC | Res. AA (%) | PUL (%) | SFC ($cm^3 \cdot s/g \times 10^{-7}$) |
|---|---|---|---|---|---|---|---|---|---|
| 47 (20) | 200 | 15 | 26.6 | 21.5 | 7.9 | 1.24 | 591 | 58 | 10 |
| 48 (21) | 500 | 2.5 | 27.1 | 20.9 | 8.7 | 1.30 | 755 | 52 | 10 |
| 49 (21) | 500 | 10 | 23.7 | 21.1 | 6.6 | 1.12 | 801 | 81 | 28 |
| 50 (21) | 500 | 20 | 20.4 | 20.1 | 5.6 | 1.01 | 707 | 94 | 110 |
| 51 (22) | 1000 | 2.5 | 23.4 | 20.3 | 6.6 | 1.15 | 466 | 89 | 33 |
| 52 (22) | 1000 | 5 | 21.4 | 19.8 | 5.5 | 1.08 | 516 | 96 | 69 |
| Ø 47-52 | | | 23.8 | 20.6 | 6.8 | 1.2 | 639.3 | 78.3 | 43.3 |

Wetting the surface of the polymeric particles prior to heat-treatment improves the absorption characteristics of the particles, as can be seen from the results presented in Table 14. In particular it significantly improves product permeability as indicated by the PUL and SFC values.

Example 53

A sample of polymer 22 was surface coated using the method described under item 5.1. 50 g of the coated polymeric particles were heat-treated as described under item 4, using an inlet gas temperature $T_{g1}$ of 190° C. and a particles temperature $T_p$ of 180° C. for 20 min.

Comparative Example 53

Example 53 was repeated, except that a sample amount of 75 g of the surface-coated polymeric particles were heat-treated as described under item 5.3. The temperature in the first and in the second oil bath were both set to 180° C. and heat-treatment was carried out for 69 min.

The results of example 53 and comparative example 53 are presented in Table 15.

TABLE 15

Results obtained in example and comparative example 53

| Ex/CE | t (min) | CRC (g/g) | $AAP_{0.7\,psi}$ (g/g) | Extr. (%) | Res. AA (%) | PUL (%) | SFC ($cm^3 \cdot s/g \times 10^{-7}$) |
|---|---|---|---|---|---|---|---|
| Ex 53 | 20 | 28.3 | 21.2 | 14.9 | 347 | 70 | 13 |
| CE 53 | 69 | 31.2 | 23.3 | 14.9 | 334 | 43 | 5 |

Even by applying a more than threefold heat-treatment time, the excellent product permeability obtained using the method of the present invention, as indicated by the PUL and SFC values, cannot be obtained by heat-treatment via surface contact.

The invention claimed is:

1. A method for heat-treating water-absorbing polymeric particles at a temperature $T_{p1}$ equal to or above 150° C., wherein said water-absorbing polymeric particles comprise a residual amount of water being between 0.3 to 7 wt.-%, based on the composition, as determined by the EDANA standard test method WSP 203.3(10) when subjected to the heat treatment, the particles are heated in a fluidization chamber of a fluidized bed dryer from an initial particle temperature $T_0$ equal to or below 50° C. to said temperature $T_{p1}$ at a heat-up rate of at least 10° C. per minute to effect surface crosslinking of said water-absorbing polymeric particles.

2. The method according to claim 1, wherein the polymeric particles are heated from said initial particle temperature $T_0$ to said temperature $T_{p1}$ in less than 10 minutes and $T_{p1}$ is in the range of from 170 to 245° C.

3. The method according to claim 1, wherein said polymeric particles are obtained by polymerising a monomer mixture comprising at least one type of ethylenically unsaturated monomer, at least one type of cross-linker and at least one type of initiator.

4. The method according to claim 3, wherein the monomer mixture additionally comprises at least one polyhydric alcohol as an additional cross-linker in an amount of at least 50 ppm, based on the total weight of ethylenically saturated monomer.

5. The method according to claim 4, wherein the polyhydric alcohol comprises glycerin.

6. The method according to claim 1, wherein after being heated to a temperature $T_{p1}$, said polymeric particles are kept in the fluid bed dryer at a temperature $T_{p2}$, wherein $T_{p1}$ and $T_{p2}$ both are in the range of from 170 to 245° C.

7. The method according to claim 1, wherein the water-absorbing polymeric particles are heated in the fluidization chamber for a residence time of from 5 to 60 minutes.

8. The method according to claim 1, wherein a solution comprising at least one organic or inorganic cross-linking agent is applied to the surface of said polymeric particles.

9. The method according to claim 8, wherein said solution comprises at least one compound selected from the group consisting of polyhydric alcohols, polyglycidyl compounds, cyclic carbonates, polyamines, alkoxysilyl compounds, polyaziridines, polyamidoamines, oxazolidones, bisoxazolines, water-soluble multivalent metal salts, metal oxides or mixtures thereof in an aqueous solvent.

10. The method according to claim 1, wherein said particles are contacted inside said fluidized bed dryer with at least one hot gas stream having a temperature $T_g$ inside said fluidization chamber of said fluidized bed dryer, said fluidization chamber, opening downwardly in at least one lower plenum chamber through at least one gas distribution bottom plate having openings formed there through for upward gas flow from said lower plenum chamber into said fluidization chamber and wherein the superficial gas velocity of said hot gas stream in the fluidized bed is in the range of from 0.1 to 0.57 m/s.

11. The method according to claim 10, wherein the pressure drop across the gas distribution bottom plate is in the range of from 100 to 900 Pa, and the total pressure drop across the bottom plate and the fluidized bed is in the range of from 2,500 to 5,000 Pa.

12. The method according to claim 2, wherein the polymeric particles are heated from said initial particle temperature $T_0$ to said temperature $T_{p1}$ in less than 10 minutes and $T_{p1}$ is in the range of from 190 to 235° C.

13. The method according to claim 3, wherein said ethylenically unsaturated monomer is an acrylic acid present at least partly in form of a salt.

14. The method according to claim 1, wherein said polymeric particles comprise a residual amount of water being in the range of from 0.5 to 6 wt. %, based on the composition, as determined by the EDANA standard test method WSP 203.3(10).

15. The method according to claim 1, wherein before being heat-treated, said polymeric particles are wetted at their surface by an amount of water being in the range of from 1 to 5 wt.-% based on the whole composition.

16. The method according to claim 1, wherein before being heat-treated, said polymeric particles are wetted at their surface by an amount of water being in the range of from 1.5 to 3.5 wt.-% based on the whole composition.

17. The method according to claim 6, wherein after being heated to a temperature $T_{p1}$, said polymeric particles are kept in the fluid bed dryer at a temperature $T_{p2}$, wherein $T_{p1}$ and $T_{p2}$ both are in the range of from 190 to 235° C.

* * * * *